(12) United States Patent
Russell

(10) Patent No.: US 9,457,898 B2
(45) Date of Patent: Oct. 4, 2016

(54) FLUID ELASTOMERIC DAMPER ASSEMBLY INCLUDING INTERNAL PUMPING MECHANISM AND CONTROL VALVE

(75) Inventor: Donald D. Russell, Fairview, PA (US)

(73) Assignee: LORD Corporation, Cary, NC (US)

( * ) Notice: Subject to any disclaimer, the term of this patent is extended or adjusted under 35 U.S.C. 154(b) by 914 days.

(21) Appl. No.: 13/814,528

(22) PCT Filed: Aug. 5, 2011

(86) PCT No.: PCT/US2011/046782
§ 371 (c)(1),
(2), (4) Date: Feb. 6, 2013

(87) PCT Pub. No.: WO2012/019117
PCT Pub. Date: Feb. 9, 2012

(65) Prior Publication Data
US 2013/0164131 A1 Jun. 27, 2013

Related U.S. Application Data

(60) Provisional application No. 61/400,958, filed on Aug. 5, 2010.

(51) Int. Cl.
| | |
|---|---|
| F16F 9/50 | (2006.01) |
| B64C 27/51 | (2006.01) |
| F16K 15/00 | (2006.01) |
| F16F 13/28 | (2006.01) |

(52) U.S. Cl.
CPC .............. B64C 27/51 (2013.01); F16F 9/50 (2013.01); F16F 13/28 (2013.01); F16K 15/00 (2013.01); Y10T 137/7837 (2015.04)

(58) Field of Classification Search
CPC .............................. B64C 27/51; B64C 27/35
USPC ............ 416/51, 52, 144, 145, 500; 188/316, 188/318, 378, 379, 267.2
See application file for complete search history.

(56) References Cited

U.S. PATENT DOCUMENTS

| | | | | |
|---|---|---|---|---|
| 5,178,241 A * | 1/1993 | Aubry | ...................... | B64C 27/51 188/280 |
| 5,219,430 A * | 6/1993 | Antoine | ................... | B64C 27/51 188/282.1 |
| 5,501,434 A * | 3/1996 | McGuire | ................. | B64C 27/51 267/140.11 |
| 8,632,308 B2 * | 1/2014 | Russell | ................... | B64C 27/35 416/145 |
| 2009/0218443 A1* | 9/2009 | Wereley | ................. | B64C 27/51 244/99.8 |

FOREIGN PATENT DOCUMENTS

| | | |
|---|---|---|
| EP | 0 447 307 | 9/1991 |
| WO | 2010/062937 | 6/2010 |

* cited by examiner

*Primary Examiner* — Woody Lee, Jr.

(57) ABSTRACT

A rotary wing system with a rotating blade and a fluid damper with a damper fluid in a first variable volume chamber and a second variable volume chamber, with a fluid damping flow valve controlled conduit and a fluid flow pressure sensing control valve assembly between the first variable volume chamber and the second variable volume chamber. The fluid flow pressure sensing control valve assembly has a fluid flow pressure sensing control valve assembly control valve for obstructing a damper fluid flow through the fluid damping flow valve controlled conduit. A working of the first variable volume chamber and the second variable volume chamber by rotary wing motions actuates the opening of the fluid flow pressure sensing control valve assembly control valve that obstructs the damper fluid flow through the fluid damping flow valve controlled conduit.

21 Claims, 24 Drawing Sheets

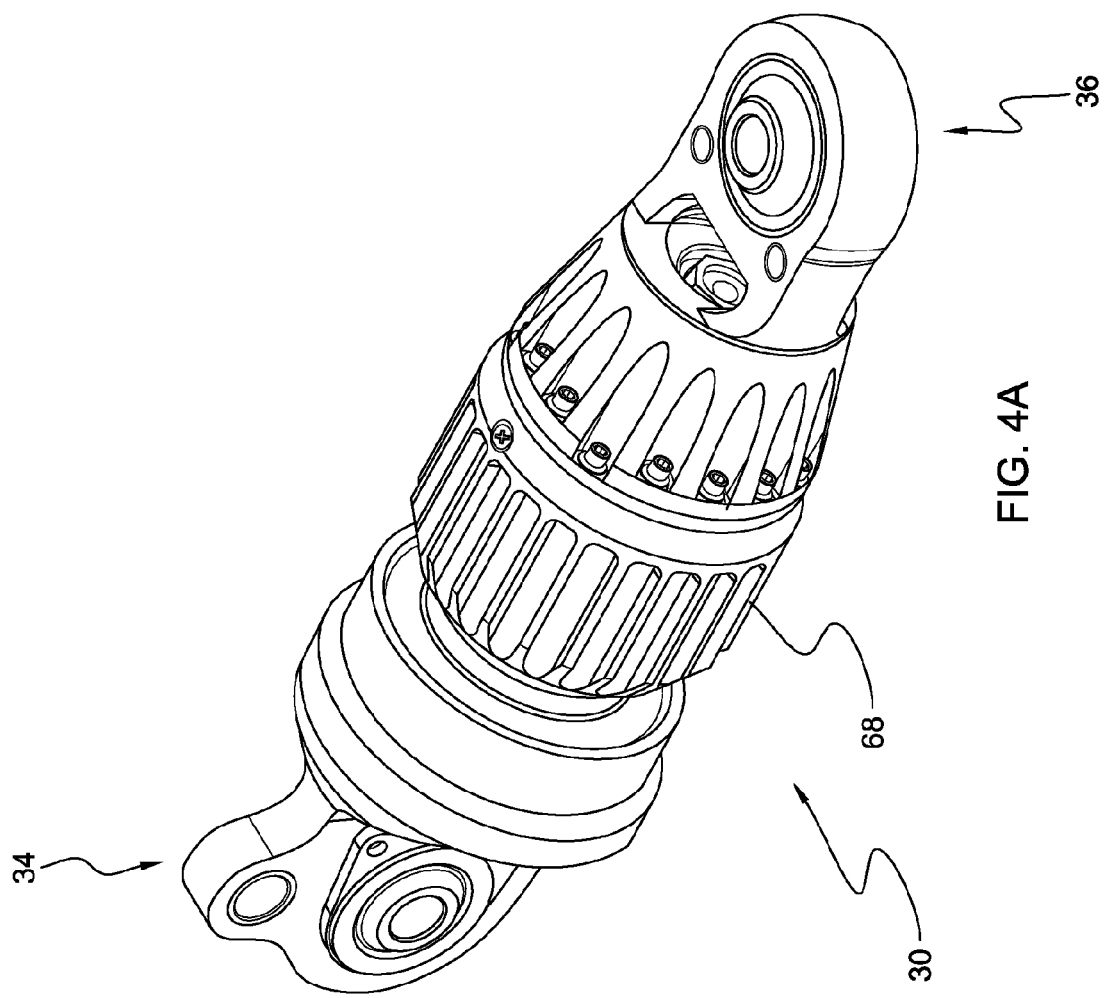

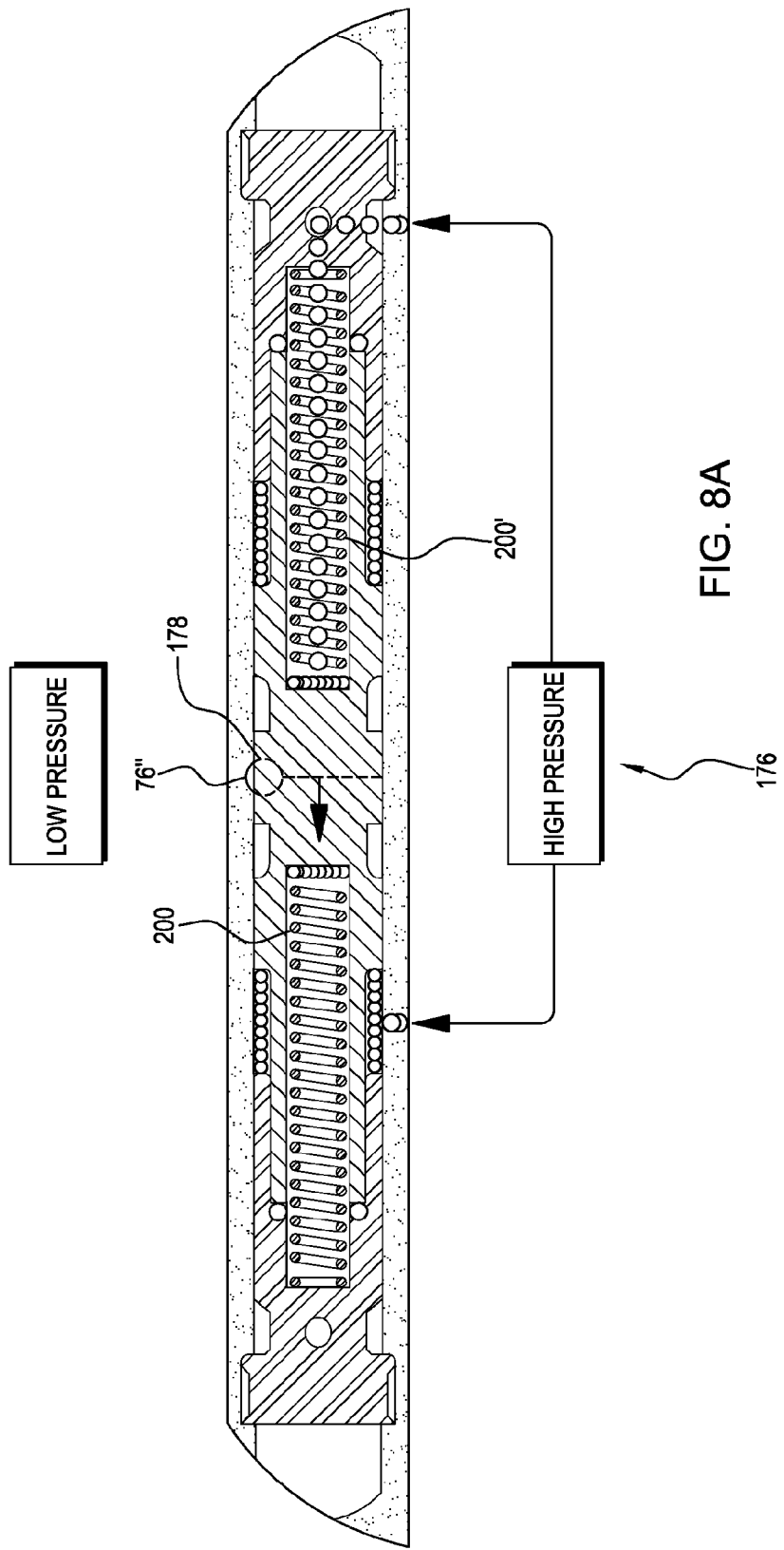

US 9,457,898 B2

FLUID ELASTOMERIC DAMPER ASSEMBLY INCLUDING INTERNAL PUMPING MECHANISM AND CONTROL VALVE

This application claims the benefit of U.S. Provisional Patent Application 61/400,958, filed on Aug. 5, 2010, titled "FLUID ELASTOMERIC DAMPER ASSEMBLY INCLUDING INTERNAL PUMPING MECHANISM AND CONTROL VALVE", which is herein incorporated by reference.

FIELD OF THE INVENTION

The invention relates to the field of rotary wing systems with working fluids. The invention relates to the field of controlling rotating blades with troublesome motion. More particularly the invention relates to the field of aircraft rotary wing blade dampers with working fluids damper chambers.

SUMMARY OF THE INVENTION

In an embodiment the invention includes a rotary wing system with at least one rotating blade rotating about a rotation axis. The rotary wing system having a troublesome motion when rotating about the rotation axis, the system including a fluid damper with a damper fluid for controlling the troublesome motion.

In an embodiment the invention includes a method for controlling a rotating blade.

In an embodiment the invention includes a rotating blade damper for a blade rotating about a rotation axis.

In an embodiment the invention includes a method of making a damper.

In an embodiment the invention includes a method of making a rotary wing aircraft machine.

In an embodiment the invention includes a damper, the damper comprised of a pumping mechanism piston for working damper fluid between a first variable volume fluid damper working chamber and a second variable volume fluid damper working chamber, and a means for controlling fluid flow between the first variable volume working chamber and the second variable volume working chamber.

In an embodiment the invention includes a fluid flow pressure sensing control valve assembly for controlling a fluid flow through a controlled conduit with the fluid flow pressure sensing control valve assembly having a fluid flow pressure sensing control valve assembly control valve for obstructing a fluid flow through the controlled conduit.

In an embodiment the invention includes a system for controlling motion with a fluid damper including a damper fluid in a first variable volume chamber and a second variable volume chamber, and a means for controlling fluid flow between the first variable volume working chamber and the second variable volume working chamber.

In an embodiment the invention includes a damper. In an embodiment the invention includes a fluid flow pressure sensing control valve assembly. In an embodiment the invention includes a fluid damper with a damper fluid in a first variable volume working chamber and a second variable volume working chamber, with a fluid damping flow valve controlled conduit and a fluid flow pressure sensing control valve assembly between the first variable volume chamber and the second variable volume chamber.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 4A-G illustrate rotating blade dampers.

FIG. 8A-B illustrate the actuation of a fluid flow pressure sensing control valve assembly.

DETAILED DESCRIPTION OF THE PREFERRED EMBODIMENT

Figure 2:
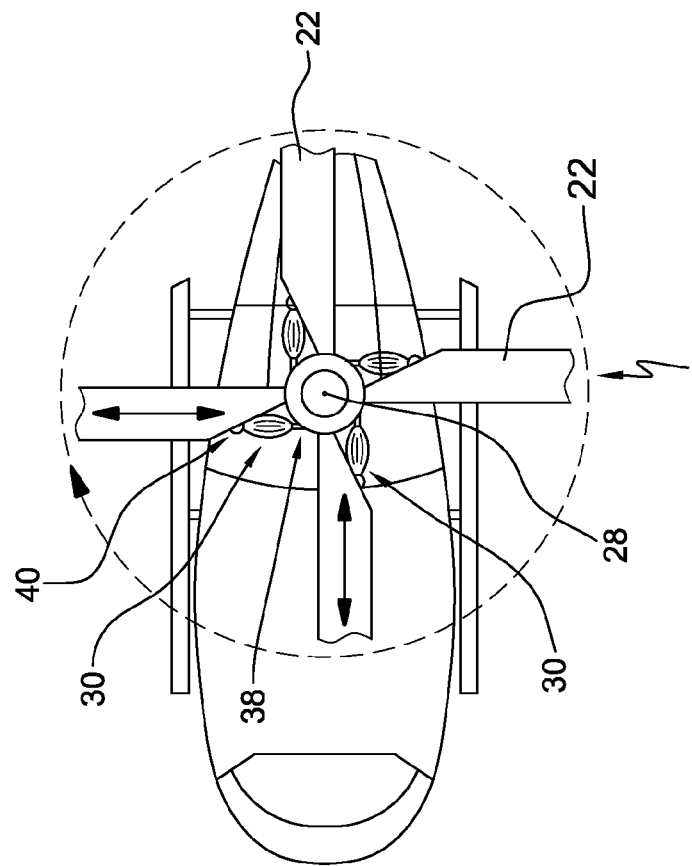
FIG. 2 illustrates a rotary wing system on a rotary wing aircraft.
Figure 1:
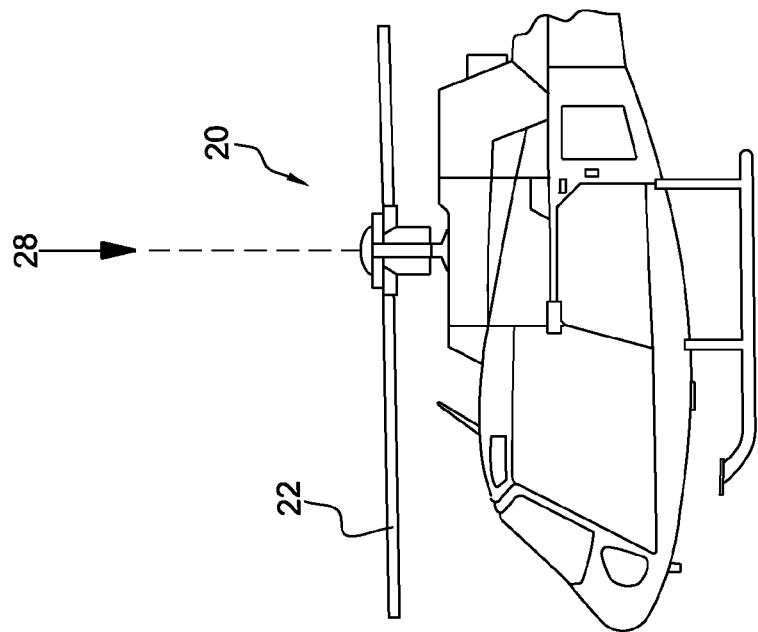
FIG. 1 illustrates a rotary wing system on a rotary wing aircraft.
Figure 3:
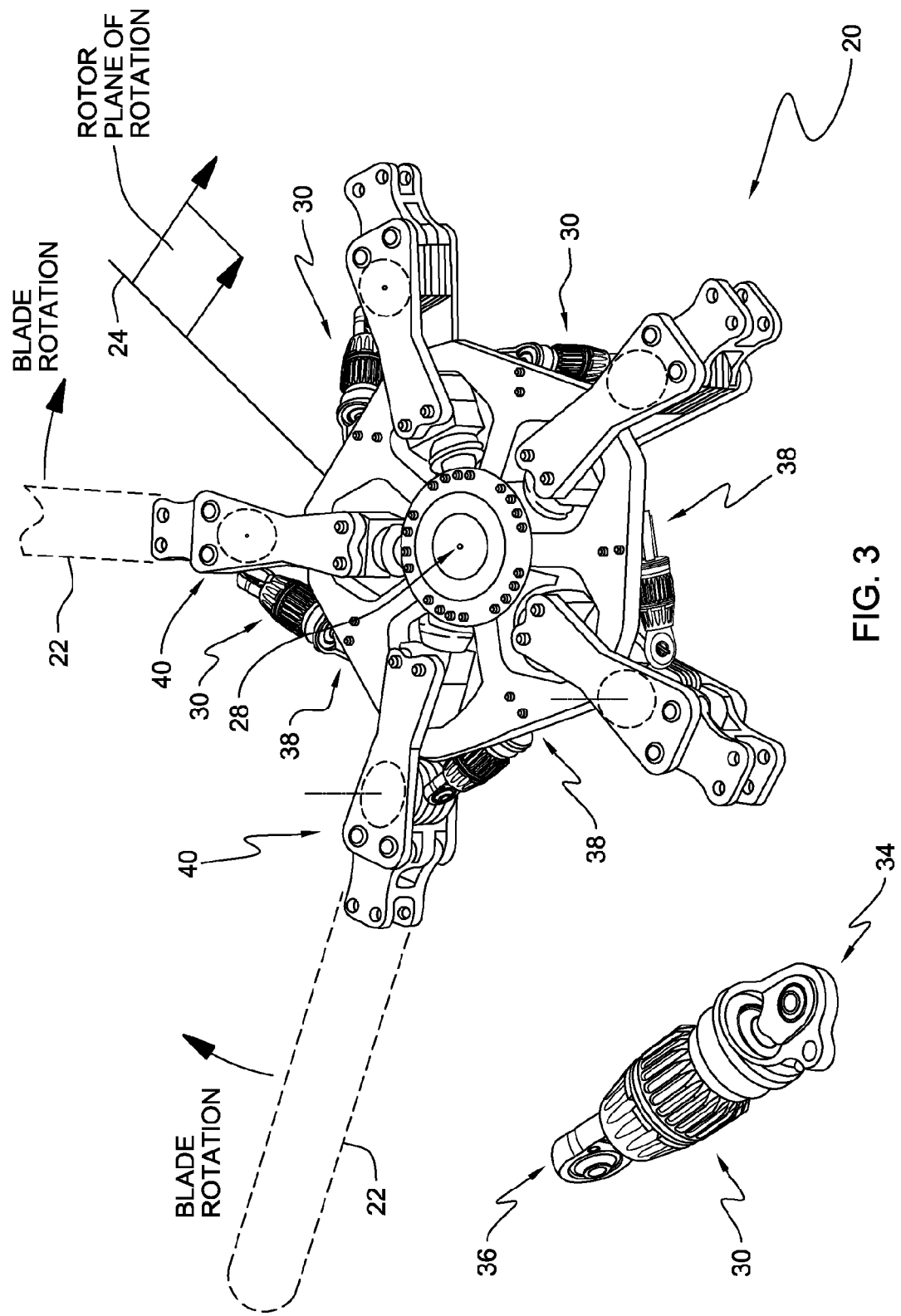
FIG. 3 illustrates a rotary wing system with rotating blade dampers to control motions.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a rotary wing system 20 with at least one rotating blade 22 rotating about a rotation axis 28, preferably in a rotor plane of rotation. The rotary wing system having a troublesome motion when rotating about the rotation axis at least at a rotation operation frequency, the system including a fluid damper 30 with a damper fluid 32 for controlling the troublesome motion. The fluid damper 30 preferably having an inboard end 34 and an outboard end 36, the fluid damper inboard end for attachment to a first rotary wing system inboard member 38 proximate the rotation axis 28 and the outboard end for attachment to a second rotary wing system outboard member 40 distal from the rotation axis 28. The fluid damper 30 containing a damper fluid volume in at least a first working chamber 42 which is worked by a relative motion preferably between the first rotary wing system inboard member and the second rotary wing system outboard member to control the troublesome motion. Preferably the at least first working chamber 42 is an inboard chamber. The damper includes an adjacent second working chamber 44, preferably an outboard chamber. Preferably the first working chamber 42 is adjacent an inboard outer fluid-elastomeric end chamber 46 and the second working chamber 44 is adjacent an outboard outer fluid-elastomeric end chamber 48. The fluid damper preferably includes a volume compensator channel 50 in fluid communication with the damper fluid through fluid conduits which eventually communicate with the damper fluid volume in the working chambers. The volume compensator channel preferably includes a centrifugal force mass member 52 movable along a volume compensating length. The volume compensator centrifugal force mass member is preferably a solid dense mass member, preferably comprised of a high density material and with a specific gravity greater than the specific gravity of the damping fluid. The volume compensator channel volume compensating length has an inboard end and an outboard end and a volume compensator channel axis 54. The volume compensator centrifugal force mass member 52 is movable along a volume compensating length of the volume compensating channel wherein a rotation about the rotation axis 28 forces the centrifugal force mass member 52 towards an outboard end of the volume compensating channel and pushes damper fluid from the volume compensator channel towards the working chambers 42 and 44.

Preferably the centrifugal force mass member 52 is comprised of a solid core 56, preferably a solid metal core. Preferably the solid metal core is a solid dense metal, preferably a high density metal material with a centrifugal force mass member specific gravity greater than the specific gravity of the damping fluid. Preferably the centrifugal force mass member 52 is comprised of a cylindrical slider with a first inboard larger OD and a second outboard smaller OD, with the second outboard OD for reception in an outboard channel receiver volume compensating length terminating outboard end 58. Preferably the centrifugal force mass member specific gravity is greater than the specific gravity of the damping fluid. Preferably the centrifugal force mass member 52 has a pressurizing weight sufficient to pressurize the fluid when rotating at an operation rotation frequency. Preferably the centrifugal force mass member 52 is comprised of an exterior sliding shell 60. Preferably the centrifugal force mass member exterior sliding shell 60 has a nominal friction coefficient f<0.25, preferably nominal friction coefficient f<0.1. Preferably the centrifugal force mass member exterior sliding shell 60 is comprised of a polymer, preferably a low friction smooth plastic coating encasing the solid metal core. Preferably the centrifugal force mass member 52 includes a fluid seal member 62, preferably an encircling circumference dynamic sliding elastomeric seal ring, preferably the circumference of the mass member 52 and volume compensator channel bore 50 is lubricated with the damping fluid 32, preferably with some fluid intentionally disposed in the gas filled non-fluid inboard side (the nitrogen charged side of the centrifugal force mass) to reduce the friction of the sliding seal 62. Preferably the centrifugal force mass member 52 is void free.

As the rotation about the rotation axis 28 forces the centrifugal force mass member 52 towards the outboard end 58 of the volume compensating channel 50 a channel gas 64 fills the inboard void space in the volume compensating channel left behind the moving centrifugal force mass member. Preferably the inboard void space in the volume compensating channel left behind the moving centrifugal force mass member includes a small amount of disposed lubricating damper fluid. In a preferred embodiment the channel gas 64 is an expanding sealed channel gas, preferably having a low pressure charge applied, preferably less than 2, preferably less than 1.5, more preferably less than 1.25, more preferably less than 1.1 atmosphere, and most preferably about one atmosphere at room temperature or operating temperature, preferably comprised of nitrogen to provide the nitrogen charged side of the centrifugal force mass. Preferably the low pressure charge is applied wherein the low pressure inhibits the gas pressure charge from urging the centrifugal force mass member towards the outboard end at rest (no rotation). In an embodiment the channel gas 64 is a filtered treaded atmospheric channel gas.

Figure 4B:
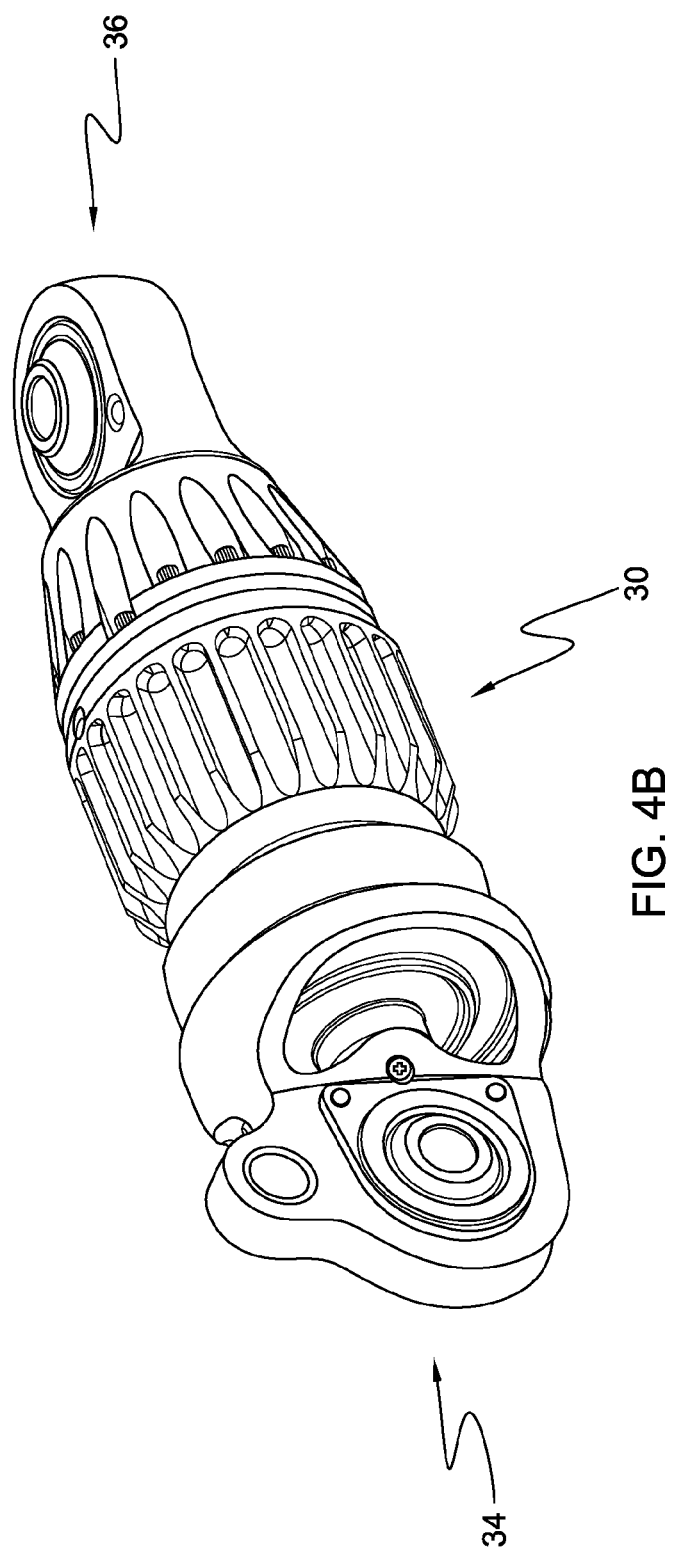
Figure 4C:
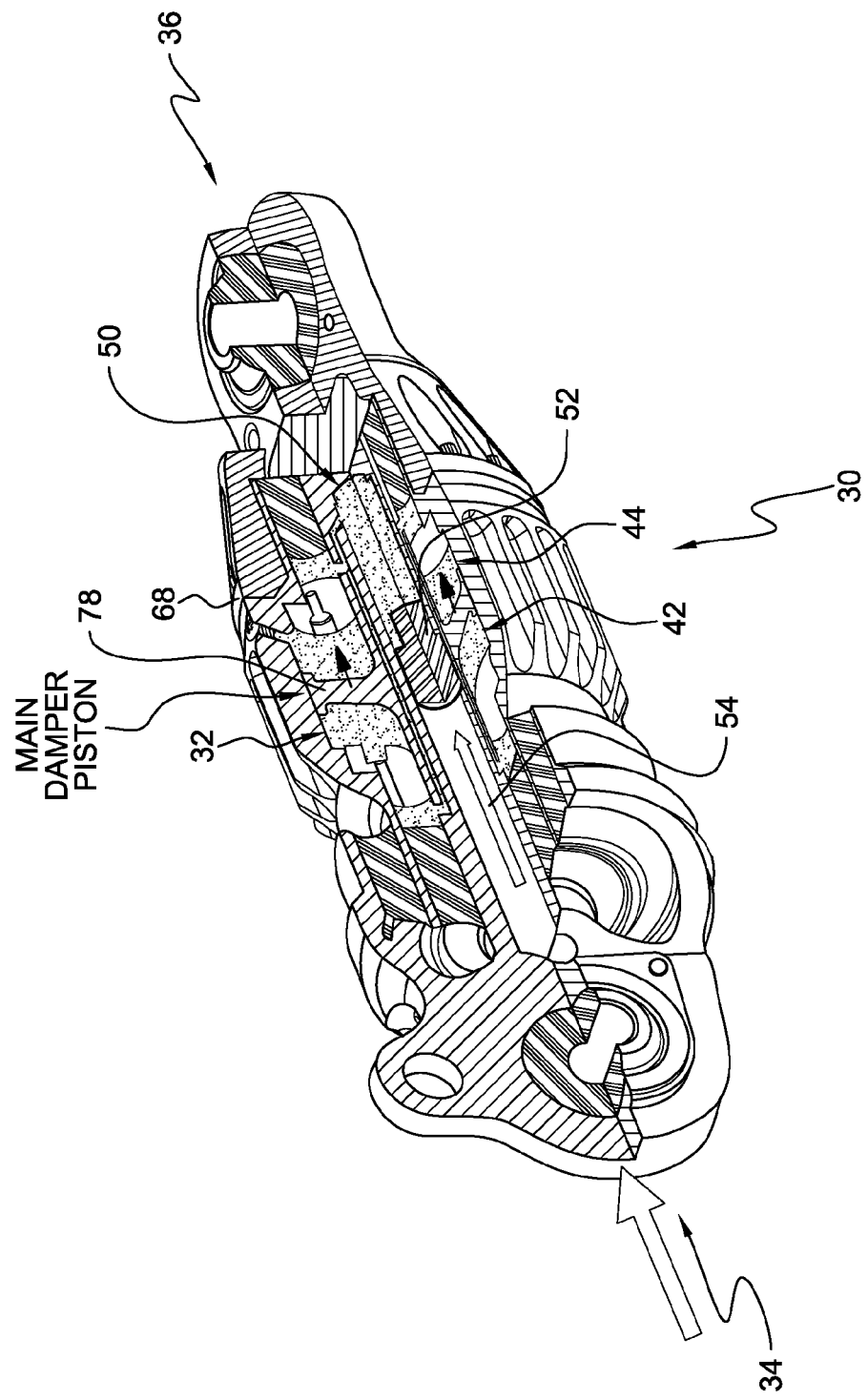
Figure 4D:
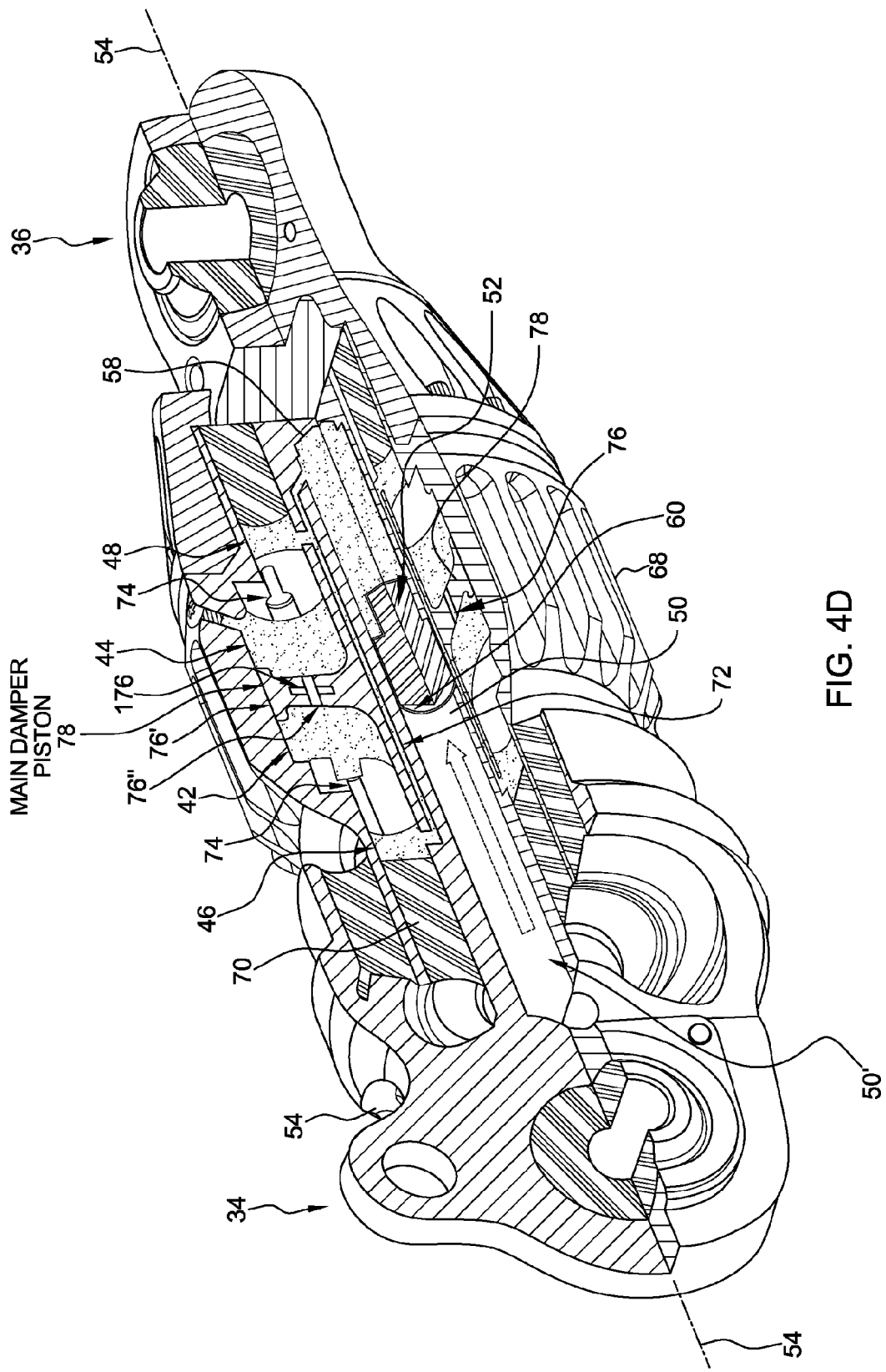
Figure 4E:
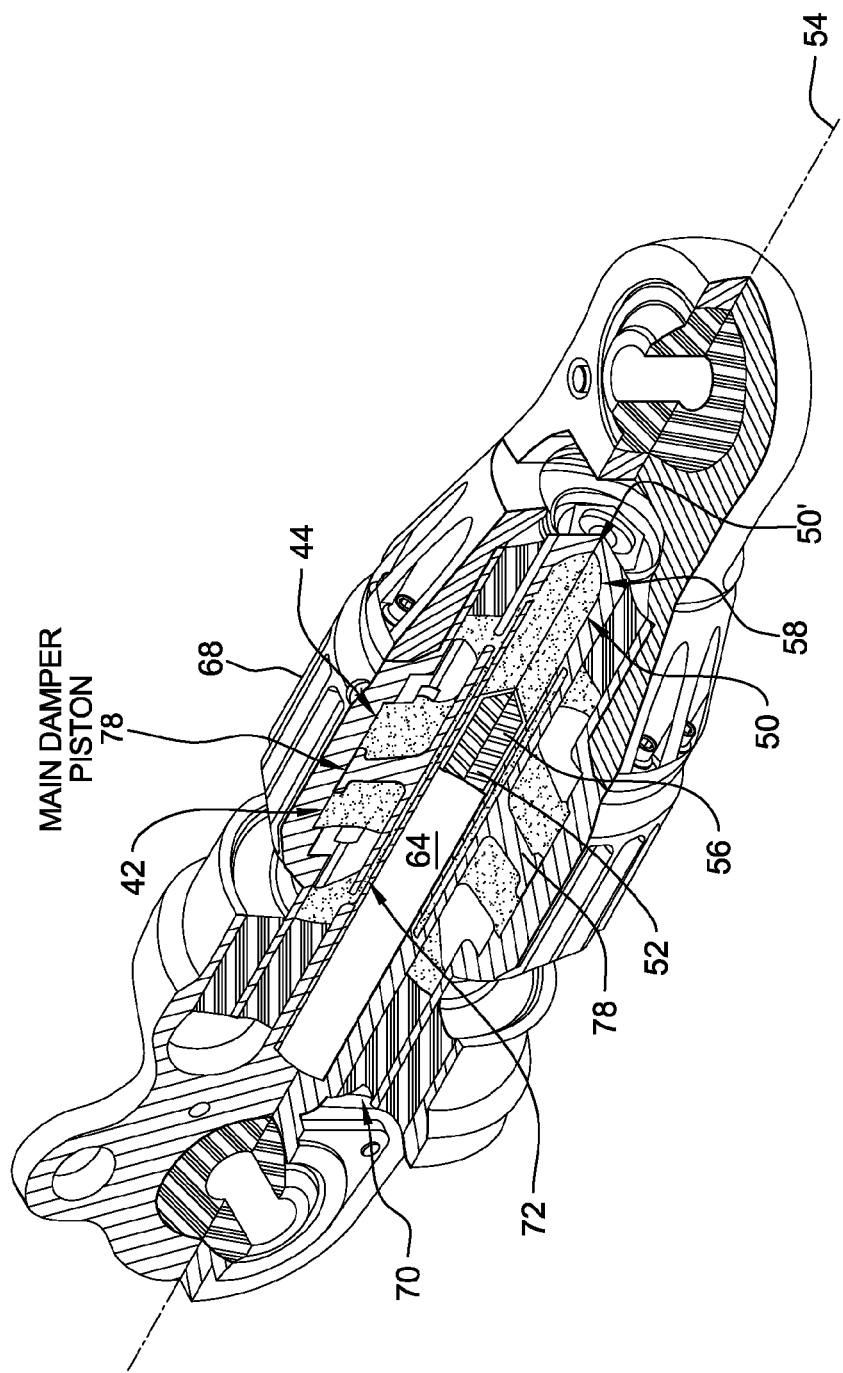
Figure 4F:
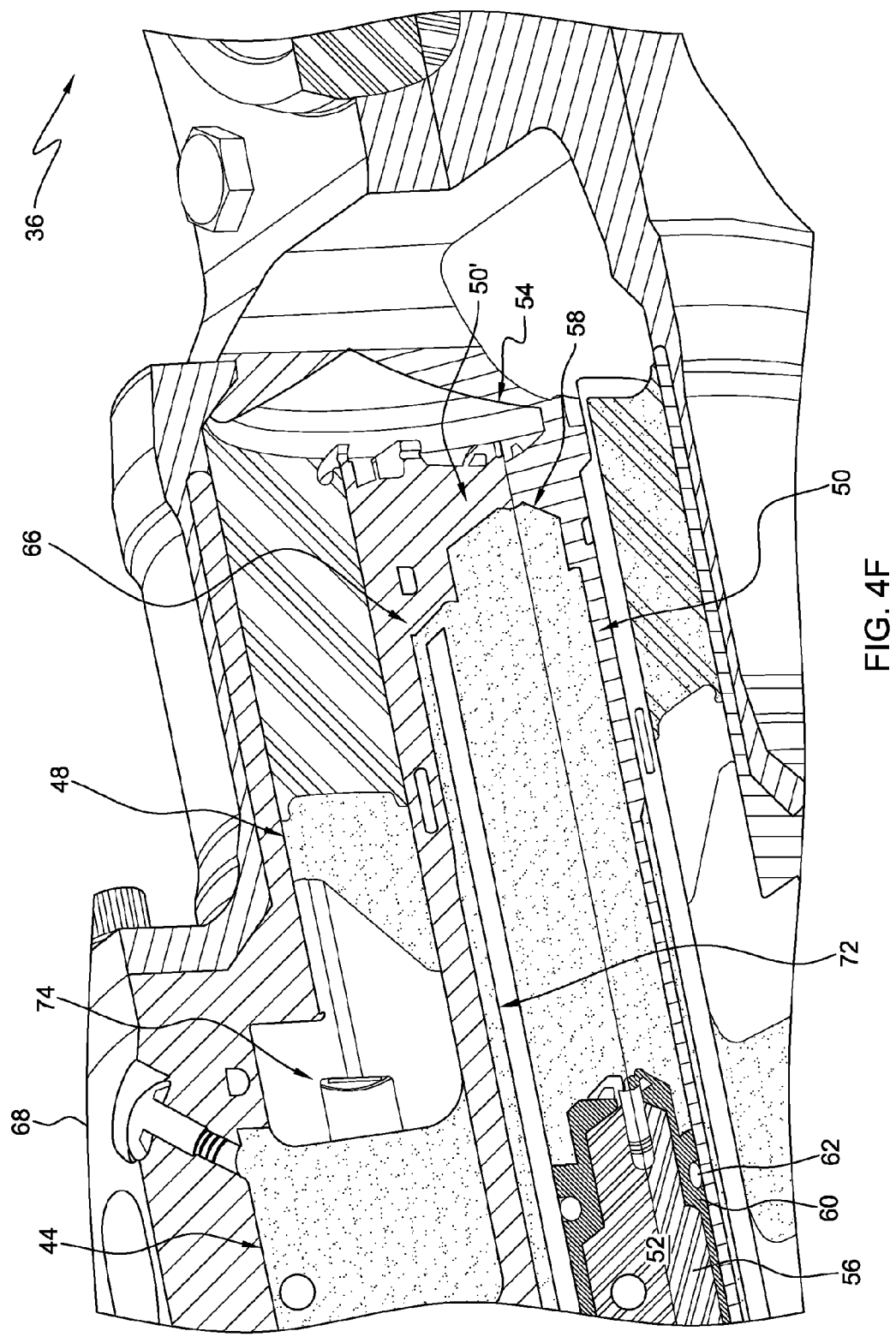
Figure 4G:
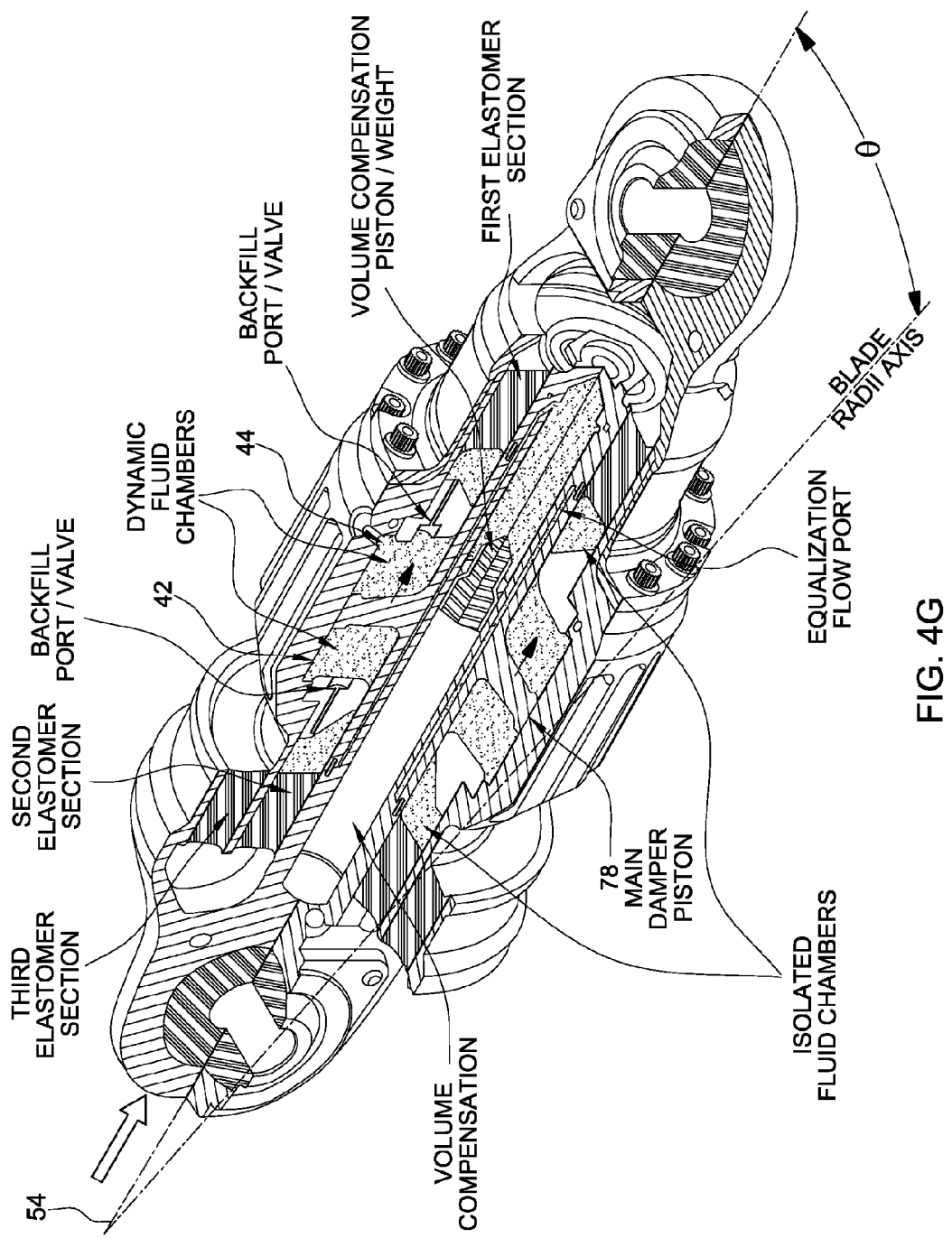
Figure 5A:
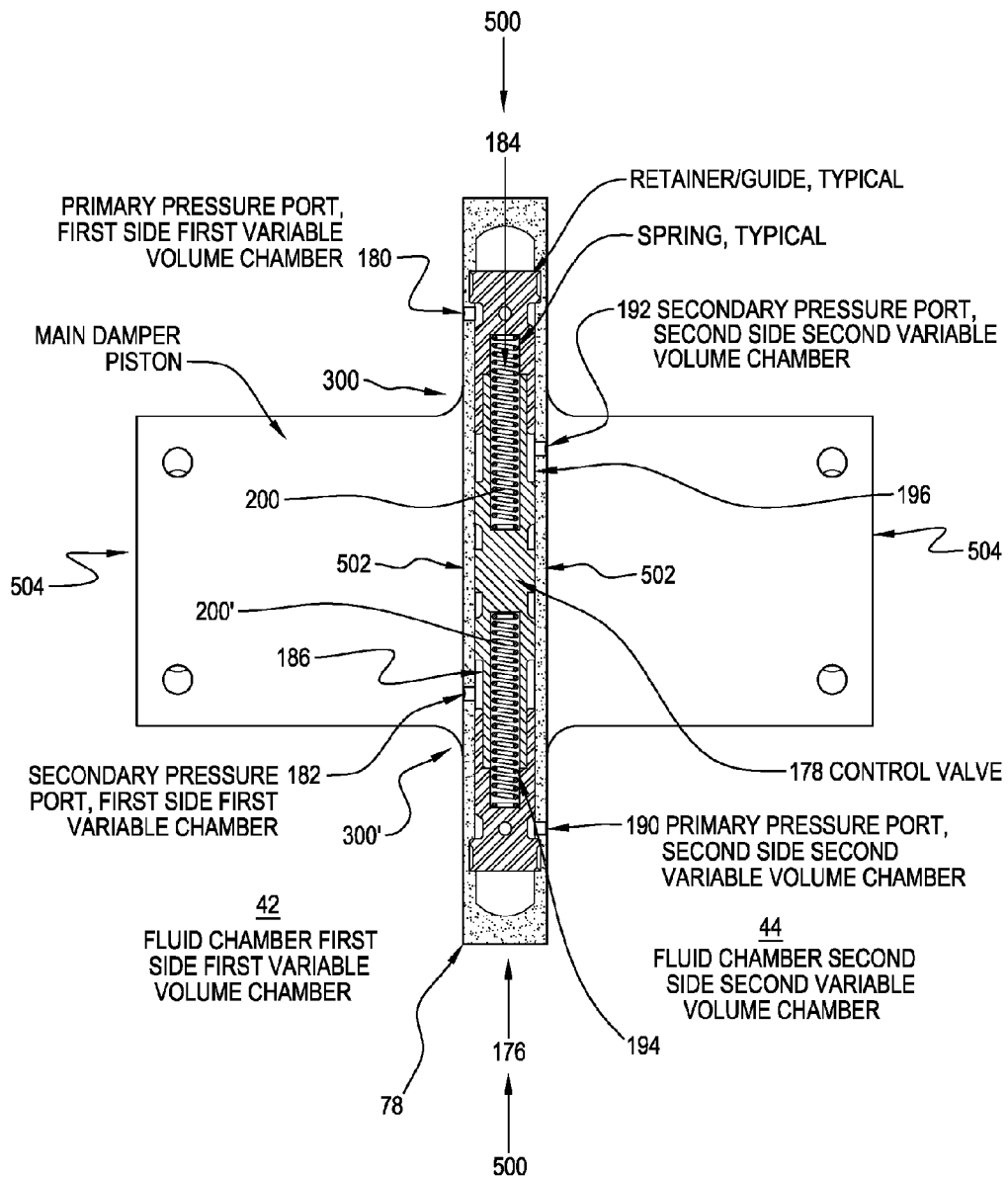
FIG. 5A-D illustrate damper pistons with fluid flow pressure sensing control valve assemblies.
Figure 5B:
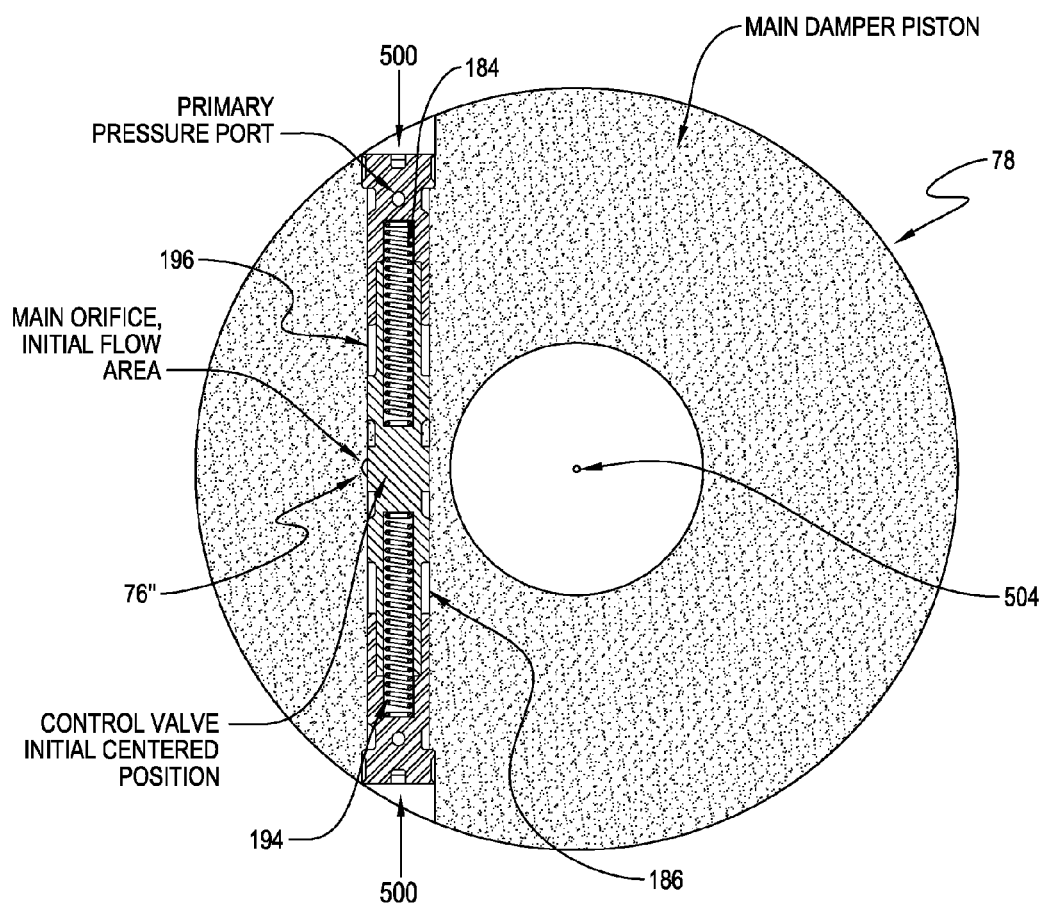
Figure 5C:
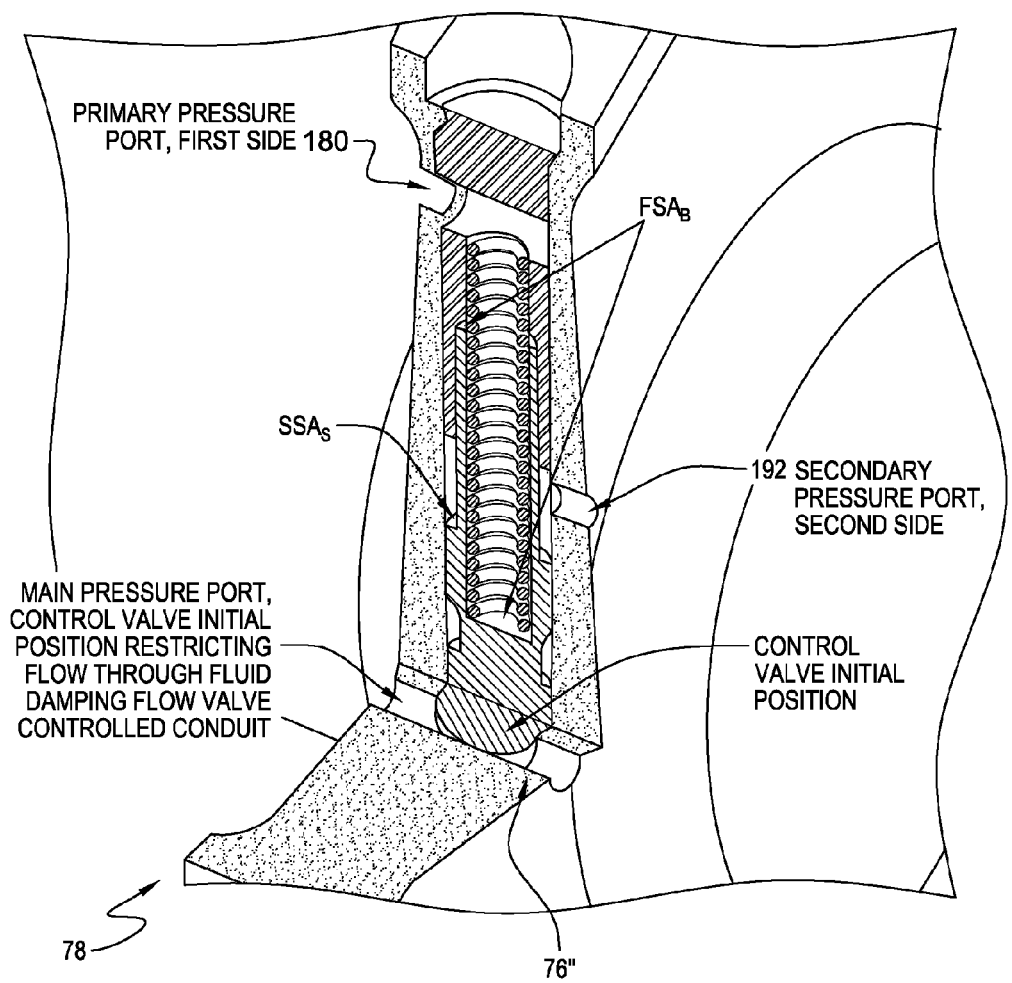
Figure 5D:
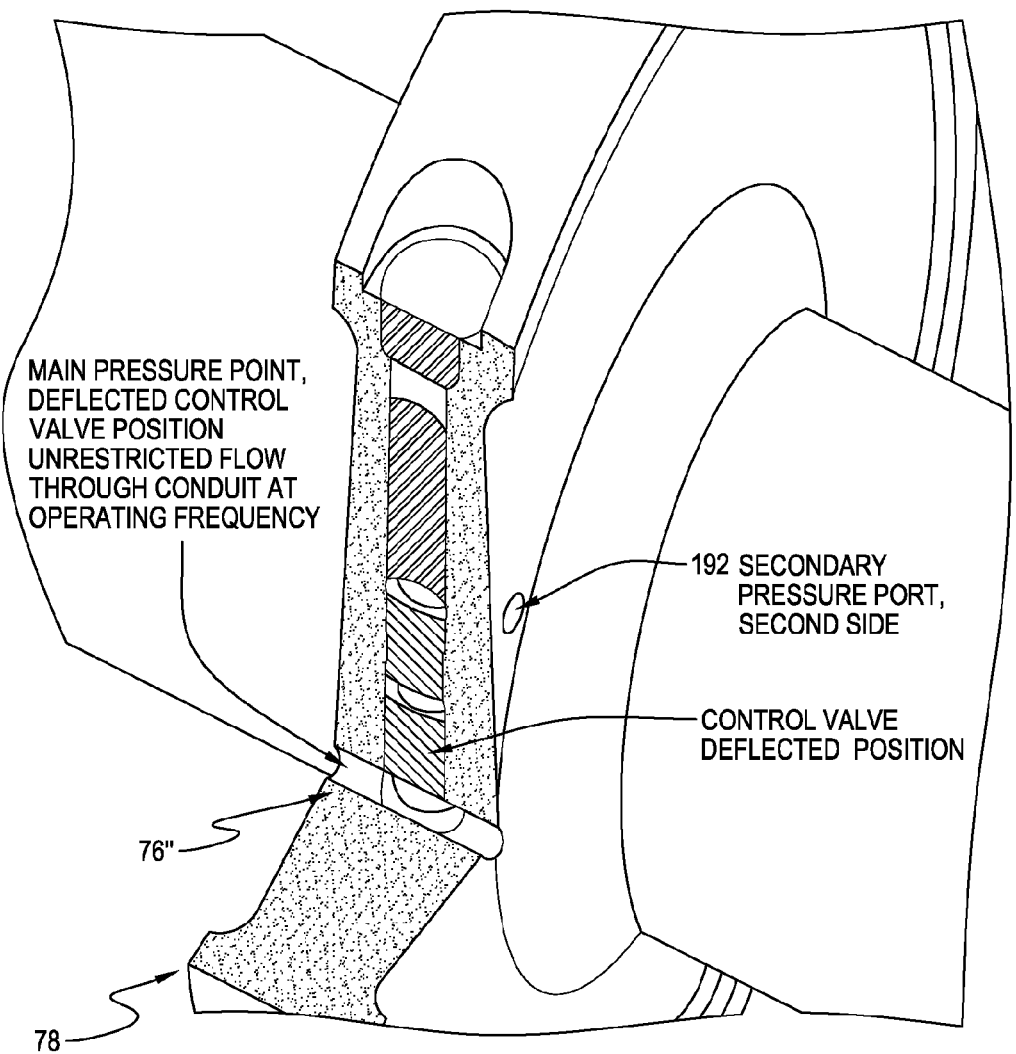
Figure 6A:
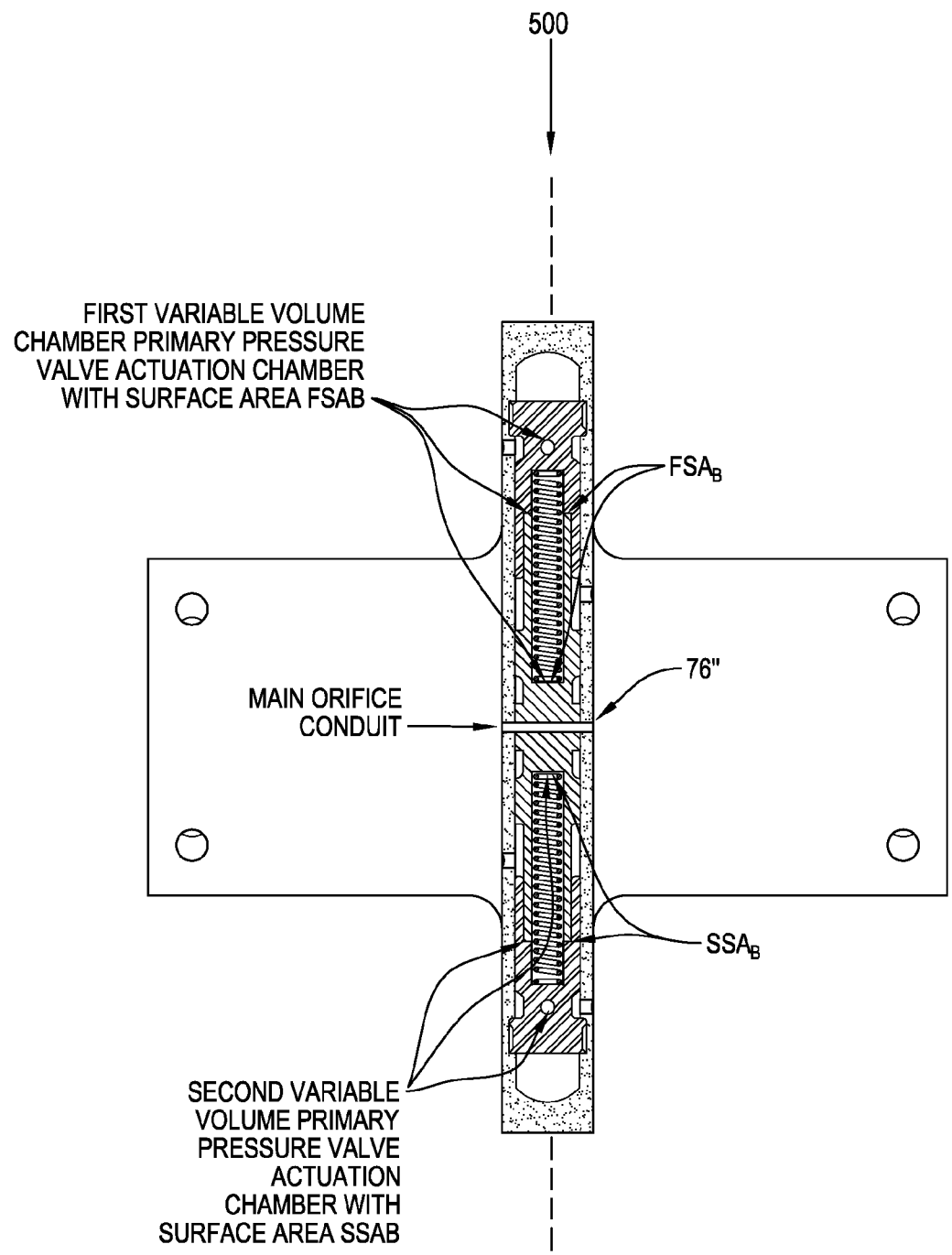
FIG. 6A-E illustrate damper pistons with fluid flow pressure sensing control valve assemblies.
Figure 6B:
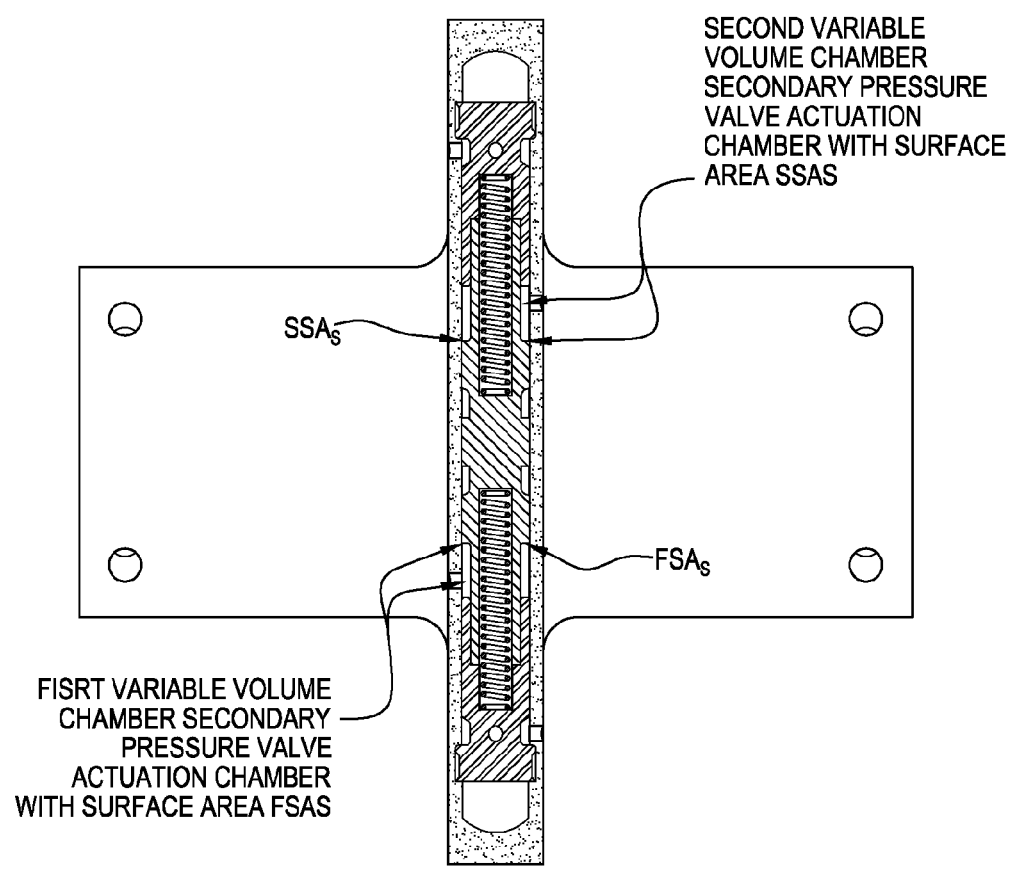
Figure 6C:
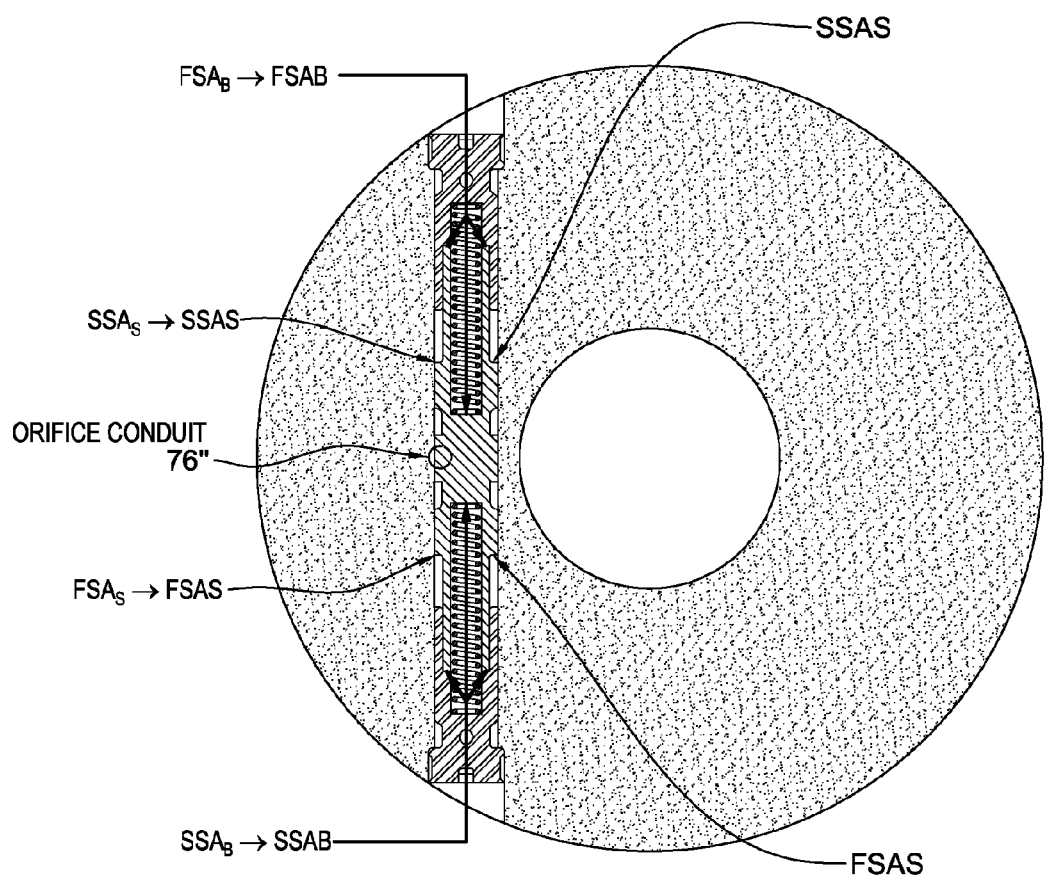
Figure 6D:
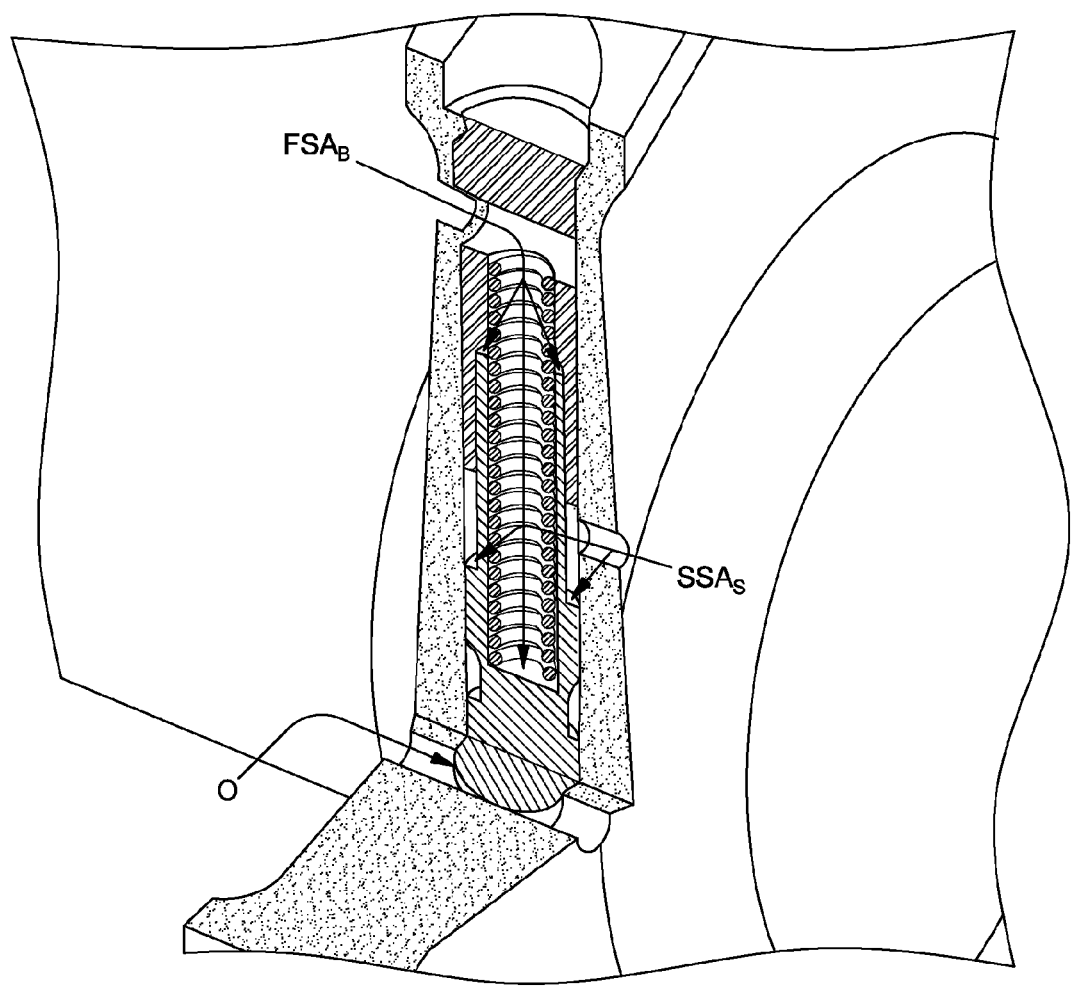
Figure 6E:
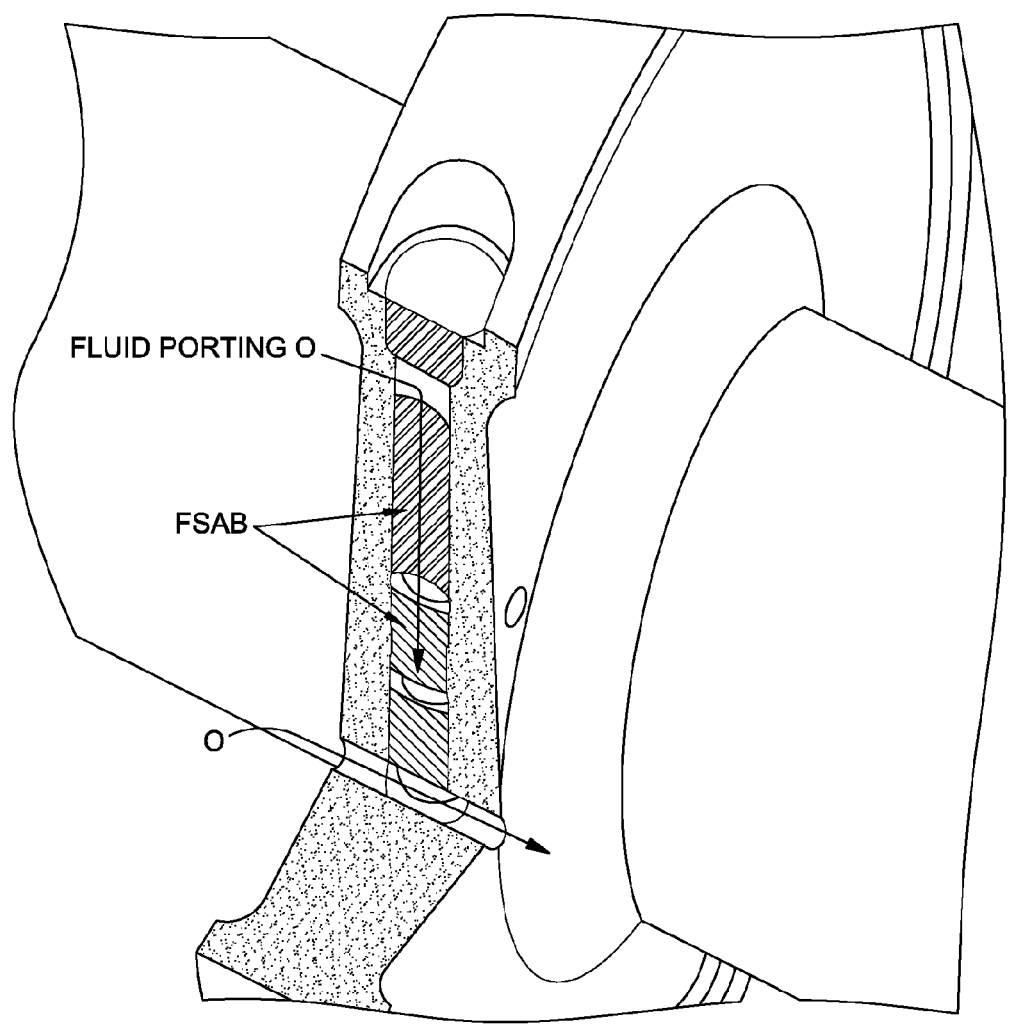
Figure 7A:
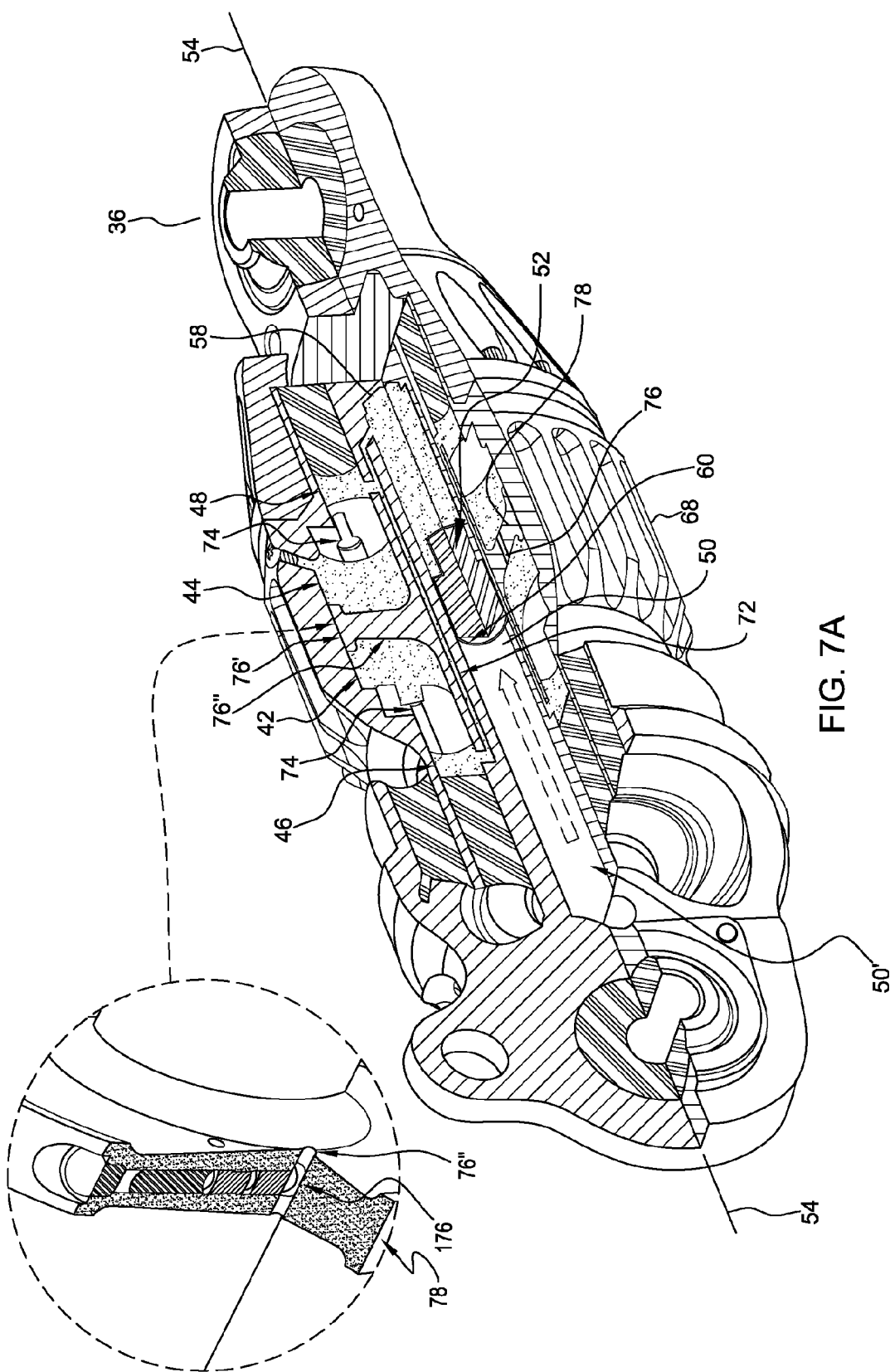
FIG. 7A-D illustrate dampers with fluid flow pressure sensing control valve assemblies.
Figure 7B:
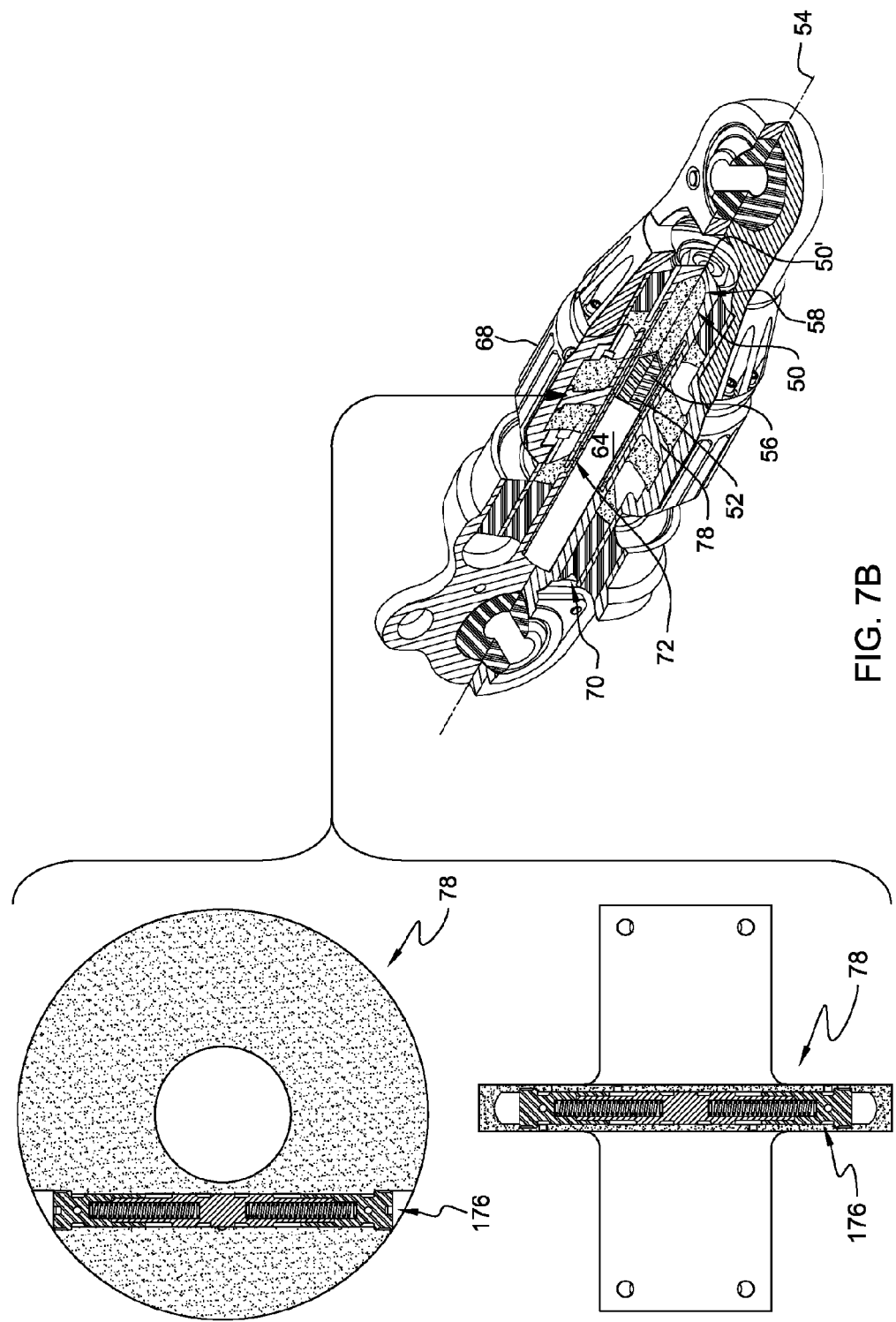
Figure 7C:
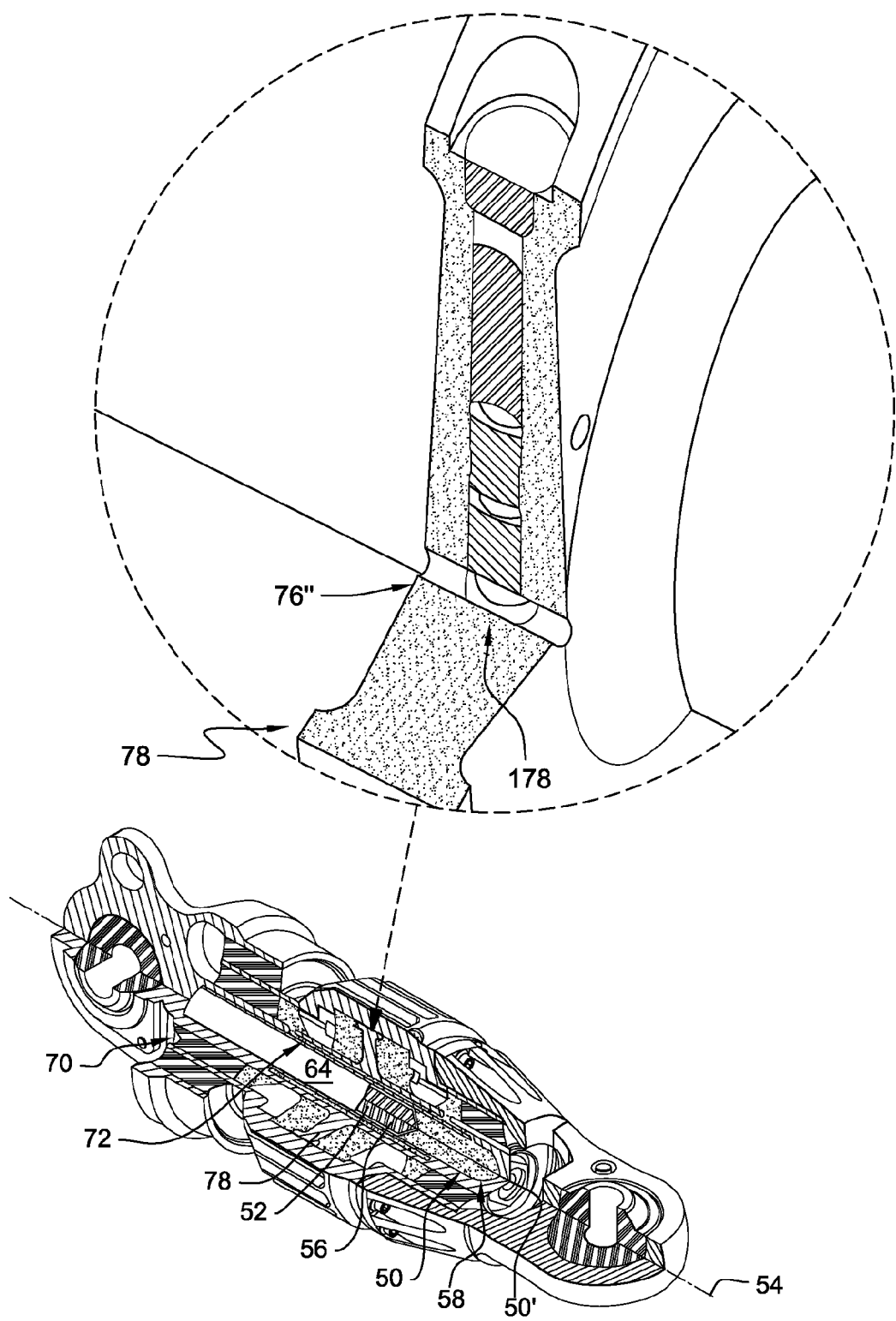
Figure 7D:
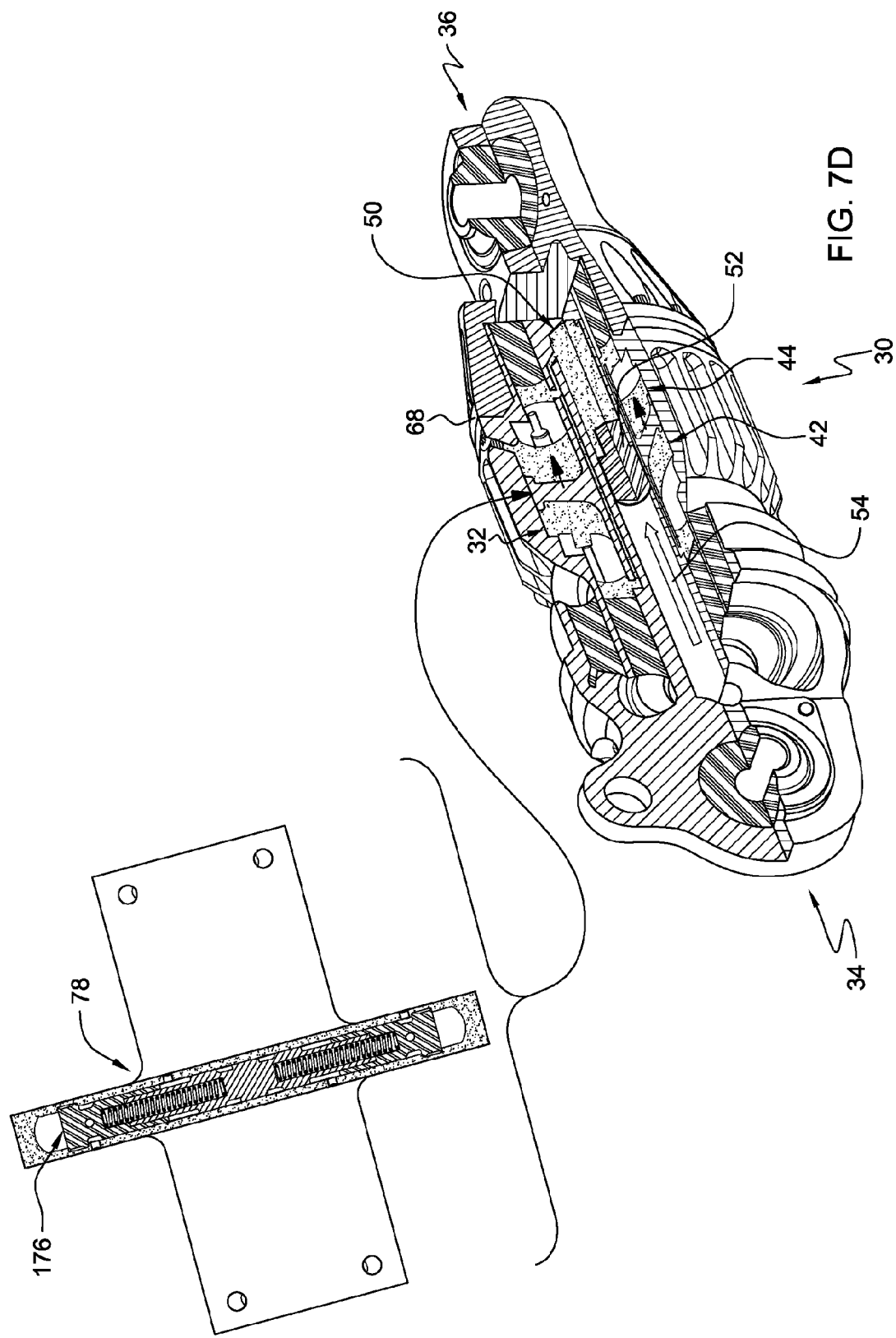
Figure 8B:
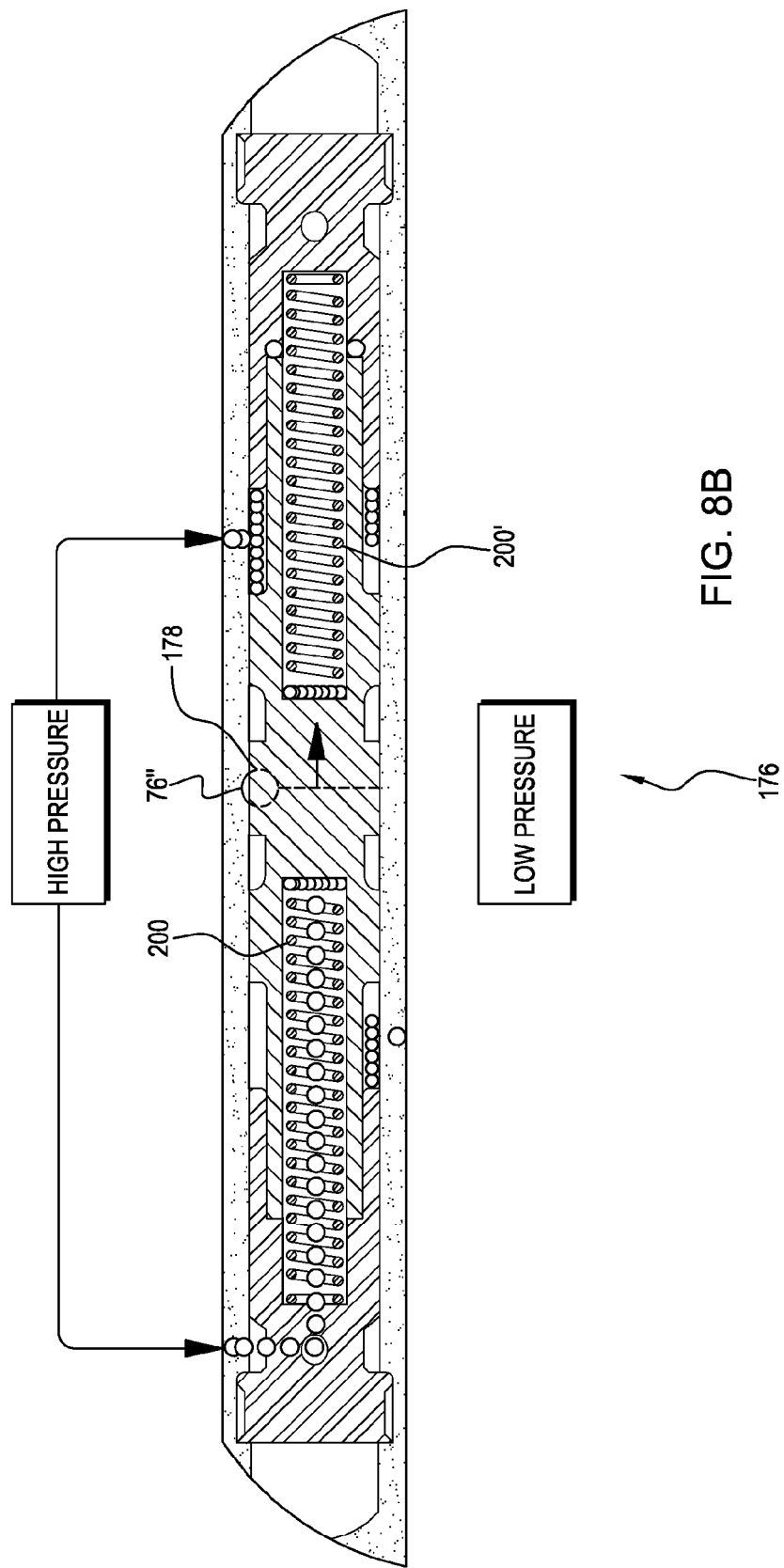

Preferably the volume compensator channel 50 is dynamically isolated from the working chambers 42 and 44, and is connected indirectly through an isolating conduit 66, having substantially narrow cross-section and substantially long length, and connected to an outer fluid elastomeric chamber. The damper is preferably comprised a nonelastomeric housing 68 and at least a first nondynamic elastomer seal 70 (preferably elastomer is bonded, and does not roll or slide or rub or provide a mechanical sliding seal). Preferably the elastomer seal is coupled to the housing with the housing and the at least first nondynamic elastomer seal providing an outer fluid-elastomeric chamber containing the damper fluid for submerging an internal pumping mechanism, the internal pumping mechanism disposed internally within the fluid-elastomeric chamber providing an inboard outer fluid-elastomeric end chamber 46 and outboard outer fluid-elastomeric end chamber 48, the internal pumping mechanism preferably including the at least first working chamber 42 adjacent the inboard outer fluid-elastomeric end chamber 46 and the second working chamber 44 adjacent the outboard outer fluid-elastomeric end chamber 48, and a longitudinally extending connection conduit 72, the longitudinally extending connection conduit 72 connecting the inboard outer fluid-elastomeric end chamber 46 and outboard outer fluid-elastomeric end chamber 48, with the first working damper fluid-filled chamber 42 and the second working damper fluid-filled chamber 44 preferably isolated from the at least first non-dynamic elastomer seal, preferably with fluid back-filler fluid one way flow control check valves 74. The inboard fluid backfiller fluid one way flow control check valves 74 prevents fluid flow from first working chamber 42 into the adjacent inboard outer fluid-elastomeric end chamber 46 but allows fluid flow from the inboard outer fluid-elastomeric end chamber 46 into the first working chamber 42. Preferably the fluid damper 30 includes a nonelastomeric housing 68 with at least a first nondynamic elastomer seal bonded to a housing member. Preferably the fluid damper 30 includes a nonelastomeric housing with at least two inboard concentric layered elastomers (elastomeric sections) bonded to a housing member, preferably centered about the volume compensator channel axis 54. Preferably the fluid damper 30 includes a nonelastomeric housing with an outboard elastomer seal (elastomer) bonded to a housing member, preferably centered about the volume compensator channel axis 54. As shown in FIG. 4D, with inboard end 34 attached to an inboard member such that a relative movement of a distal outboard member moves outboard end 36, the damper is worked with inboard end 34 stationary relative to the moving outboard end 36, with the inboard end of the damper extending through the two inboard concentric layered elastomers with its internal pumping mechanism piston 78 providing the working chambers 42, 44, with the surrounding outer housing moving back and forth working the fluid through fluid orifices 76, 76'. Preferably with the fluid backfiller fluid one way flow control check valves 74 fluid is allowed to back fill into the working chambers to ensure they are full of fluid. Additionally the connection conduit axially extends along a length of the damper to allow cross connection of fluid between the inboard and outboard ends of the fluid-elastomeric chamber. When the damper is rotated the compensating mass moves outward and pressurizes the damper fluid, with the damper fluid from the compensator forced out through the isolating conduit 66 into the connecting conduit 72 to apply a fluid pressure to the damper fluid in fluid communication with the chambers 42, 44.

In an embodiment the invention includes a method for controlling a rotary wing aircraft rotating blade. The method includes providing a rotary wing aircraft rotating blade 22 which rotates about a rotation axis 28. The method includes providing a fluid damper 30 with a damper fluid 32 and at least a first working chamber 42 for controlling a motion of the rotating blade. The method preferably includes providing a volume compensator 50' with a volume compensator channel 50 in fluid communication with the damper fluid, the volume compensator channel including the centrifugal force mass member 52 movable along the volume compensating length of the volume compensating channel, and linking the fluid damper and the volume compensator with the rotating blade wherein a rotation about the rotation axis forces the centrifugal force mass member towards an outboard end of the volume compensating channel and pushes damper fluid from the volume compensator channel towards the at least first working chamber. Preferably the rotating blade has a blade axis radii radiating outward and normal from the rotation axis, and the volume compensating length has a volume compensator channel axis substantially aligned with the blade radii axis, preferably with alignment sufficient to advantageously use the centrifugal force effects of rotation about the axis of rotation, preferably with the angle between the volume compensator channel axis and the radii extending normal from the rotation axis (and preferably the blade axis) is less than 45 degrees.

In an embodiment the invention includes a rotating blade damper for a blade rotating about a rotation axis, the blade damper including a fluid damper with a damper fluid for controlling a troublesome blade motion. The fluid damper preferably has the first inboard end and the second outboard end, with the fluid damper inboard end for attachment to a first inboard member (proximate the rotation axis) and the outboard end for attachment to a second outboard member (distal from the rotation axis). The fluid damper containing a damper fluid volume in at least a first working chamber which is worked by a relative motion between the first and second ends to control the troublesome motion, the blade damper preferably including a volume compensator channel in fluid communication with the damper fluid. The volume compensator channel preferably including a centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the at least first working chamber.

The centrifugal force mass member is preferably comprised of a metal core, and is preferably a cylindrical slider with a first inboard larger OD and a second outboard smaller OD, with the second outboard OD for reception in an outboard channel receiver volume compensating length terminating outboard end.

The centrifugal force mass member is preferably comprised of an exterior sliding shell, preferably a polymer, preferably a low friction smooth plastic coating encasing the solid metal core.

As the rotation about the rotation axis forces the centrifugal force mass member towards the outboard end of the volume compensating channel a channel gas fills the inboard void space in the volume compensating channel left behind the moving centrifugal force mass member. Preferably the channel gas is an expanding sealed channel gas sealed within the channel. Preferably the channel gas is a treaded filtered atmospheric channel gas. In an embodiment the treated filtered atmospheric channel gas is filtered from the surrounding ambient atmosphere.

Preferably the volume compensator channel is dynamically isolated from the working chambers. Preferably the volume compensator channel 50 is dynamically isolated from the working chambers 42 and 44, and is connected indirectly through an isolating conduit 66, having substantially narrow cross-section and substantially long length, and connected to an outer fluid elastomeric chamber. The damper is preferably comprised a nonelastomeric housing 68 and at least a first nondynamic elastomer seal 70 (elastomer is bonded, does not roll or slide or rub, is not a mechanical sliding seal). Preferably the elastomer seal is coupled to the housing with the housing and the at least first nondynamic elastomer seal providing an outer fluid-elastomeric chamber containing the damper fluid for submerging an internal pumping mechanism, the internal pumping mechanism disposed internally within the fluid-elastomeric chamber providing an outer fluid-elastomeric end chamber 46 and outer fluid-elastomeric end chamber 48, the internal pumping mechanism including the at least a first working chamber 42 adjacent the fluid-elastomeric end chamber 46 and the second working chamber 44 adjacent the fluid-elastomeric end chamber 48, and a longitudinally extending connection conduit 72, the longitudinally extending connection conduit 72 connecting the inboard outer fluid-elastomeric end chamber 46 and outboard outer fluid-elastomeric end chamber 48, with the first working damper fluid-filled chamber 42 and the second working damper fluid-filled chamber 44 preferably isolated from the at least first nondynamic elastomer seal, preferably with fluid backfiller fluid one way flow control check valves 74. The inboard fluid backfiller fluid one way flow control check valves 74 prevents fluid flow from first working chamber 42 into the adjacent the inboard outer fluid-elastomeric end chamber 46 but allows fluid flow from the inboard outer fluid-elastomeric end chamber 46 into the first working chamber 42. Preferably the fluid damper 30 includes a nonelastomeric housing 68 with at least a first nondynamic elastomer seal bonded to a housing member. Preferably the fluid damper 30 includes a nonelastomeric housing with at least two inboard concentric layered elastomers (elastomeric sections) bonded to a housing member, preferably centered about the volume compensator channel axis 54. Preferably the fluid damper 30 includes a nonelastomeric housing with an outboard elastomer seal (elastomer) bonded to a housing member, preferably centered about the volume compensator channel axis 54. As shown in FIG. 4D, with inboard end 34 attached to an inboard member such that a relative movement of a distal outboard member moves outboard end 36, the damper is worked with inboard end 34 stationary relative to the moving outboard end 36, with the inboard end of the damper extending through the two inboard concentric layered elastomers with its internal pumping mechanism piston 78 providing the working chambers 42, 44, with the surrounding outer housing moving back and forth working the fluid through fluid orifices 76, 76'. With the fluid backfiller fluid one way flow control check valves 74 fluid is allowed to back fill into the working chambers to ensure they are full of fluid. Additionally, the connecting conduit axially extends along a length of the damper to allow cross connection of fluid between the inboard and outboard ends of the fluid-elastomeric chamber. When the damper is rotated the compensating mass moves outward and pressurizes the damper fluid, with the damper fluid from the compensator forced out through the isolating conduit 66 into the connecting conduit 72 to apply a fluid pressure to the damper fluid in fluid communication with the chambers 42, 44.

In an embodiment the invention includes a method of making a damper. The method includes providing a damper fluid. The method includes providing a housing for containing the damper fluid in at least a first working chamber and at least a second working chamber. The method preferably includes providing a volume compensator with a volume compensator channel in fluid communication with the damper fluid, the volume compensator channel including a centrifugal force mass member movable along a volume compensating length having an inboard end and outboard end, wherein a rotation of the volume compensator with the volume compensating length outboard end outboard of the volume compensating length inboard end forces the centrifugal force mass member towards the outboard end of the volume compensating channel and applies a pressure to the damper fluid.

In an embodiment the invention includes a method of making a rotary wing aircraft rotating blade machine. The method includes providing a rotary wing rotating blade rotor which rotates about an axis of rotation, the rotating blade rotor including a fluid member, the fluid member including a housing containing a working fluid.

In an embodiment the invention includes a method of making a rotary wing aircraft machine. The method including providing a rotary wing rotor which rotates about an axis of rotation, the rotary wing rotor including a fluid member, the fluid member including a housing containing a working fluid.

Preferably the damper comprises a main rotor lead-lag damper for a rotary wing aircraft and includes a fluid damping element and elastomeric stiffness elements. The first and second elastomeric stiffness elements are preferably integrally bonded to the inboard and outboard metal housings and the inner structural components forming the fluid enclosure. Preferably a third elastomeric section, which works in conjunction with the fluid damping element and the first and second elastomeric sections, provides additional stiffness and damping. Preferably the fluid chambers formed in the assembly by the first and second elastomer sections, piston, guide bushings and rigid housings are inter-connected by fluid flow passages. Relative motion of the structurally joined inboard and outboard outer housings and the internal structural components, inner bonded components, piston and central compensator bolt, results in displacement of fluid through an orifice restriction (orifice that restricts fluid flow). Restricting the fluid flow between the fluid working chambers creates fluid flow losses that result in differential dynamic pressures in the fluid working chambers. The differential pressure in the fluid working chambers acts on the damper piston which provides the damping force. Damping performance is preferably enhanced by restrictive clearances within the damping device. Preferably no mechanical sliding seals are necessary to provide the damping force. Fluid flow around the piston circumference at the outer housing and guide bushing interfaces is preferably controlled by means of highly restrictive fluid flow areas at these locations. The high restrictive fluid flow areas are controlled preferably by applying geometry control to the components. Secondary fluid chambers are preferably formed by the guide bushings which isolate the dynamic pressures from the elastomer sections and control the piston to outer housing location. The isolation is preferably provided by means of the high resistance fluid flow areas at the piston to guide bushing interface. Preferably fluid pressure equalization flow ports, which interconnect the isolated fluid chambers adjacent to the first and second elastomer sections, minimize dynamic pressures acting on the first and second elastomer sections that form the flexible dynamic seals. Preferably no mechanical sliding seals are required or utilized. The volume compensation chamber preferably provides for thermal effects on the fluid and is inter-connected to the fluid chambers. The volume compensation chamber is preferably pressurized to provide a positive pressure within the damper assembly which is hermetically sealed from the outside environment. The pressure is preferably sufficient to maintain at least one atmosphere of internal pressure for all predetermined aircraft operating conditions. Preferably the internal steady pressure within the damper assembly is supplemented by the centrifugal force acting on the compensator piston which is preferably weighted to provide force sufficient enough to pressurize the fluid. The centrifugal force generated overcomes frictional forces acting on the compensator seal and piston and provide an internal pressure sufficient to actuate the fluid chamber backfill valves. The backfill valves are incorporated in the primary fluid chambers to replenish the fluid displaced from the dynamic pressure chambers through the high resistance fluid flow areas at the piston to guide bushing interface during operation. The backfill valves preferably actuate if the pressure in the primary chambers are less than the pressure in the isolated fluid chambers. The amount of fluid replenishment into the primary dynamic fluid chambers is preferably small which results in minimal actuation of the backfill valves. Backfill valves preferably allow the damper to function at low steady operating pressures. Centrifugal forces acting on the damper assembly are preferably reacted by the elastomeric elements and by guide bushings located within the damping element. The guide bushings preferably form part of the damping element and are manufactured from a low friction bearing material. The guide bushings preferably provide location control of the internal components and isolate dynamic pressures from the elastomer sections. Preferably no damping is provided by the guide bushings. The damping fluid preferably lubricates the guide bushings during operation, preferably reducing heat generation and wear. The fluid damper is preferably connected at one end to the blade assembly and on the other end to the rotor hub. Spherical bearings are incorporated preferably in the attachment housings at each end of the damper to accommodate relative motion between the blade assembly, the damper and the hub. The internal preferred geometry of the lead/lag damper is illustrated in FIG. 4.

In an embodiment the invention includes a rotary wing system with at least one rotating blade rotating about a rotation axis, the rotary wing system having a rotor blade natural frequency (ground resonance frequency) and a rotor wing system operating frequency (inflight rotary wing rotation frequency) when rotating about the rotation axis, the system including a fluid damper 30 with a damper fluid 32 in a first variable volume working chamber 42 and a second variable volume working chamber 44, with a fluid damping flow valve controlled orifice conduit 76" and a fluid flow pressure sensing control valve assembly 176 between the first variable volume chamber 42 and the second variable volume chamber 44. Preferably the fluid flow pressure sensing control valve assembly 176 has a fluid flow pressure sensing control valve assembly control valve 178 for obstructing a damper fluid flow through the fluid damping flow valve controlled orifice conduit 76", a first variable volume working chamber primary pressure port 180 and a first variable volume working chamber distal secondary pressure port 182, the first variable volume chamber distal secondary pressure port 182 distal from the first variable volume chamber primary pressure port 180, the first variable volume chamber primary pressure port 180 porting damper fluid 32 from the first variable volume chamber 42 to a first variable volume chamber primary pressure valve actuation chamber 184 with a first variable volume chamber primary pressure actuation surface area $FSA_B$ of the fluid flow pressure sensing control valve assembly control valve 178, the first variable volume chamber distal secondary pressure port 182 porting damper fluid 32 from the first variable volume chamber 42 to a first variable volume chamber secondary pressure valve actuation chamber 186 with a first variable volume chamber secondary pressure actuation surface area $FSA_S$ of the fluid flow pressure sensing control valve assembly control valve 178. Preferably the fluid flow pressure sensing control valve assembly 176 includes a second variable volume chamber primary pressure port 190 and a second variable volume chamber distal secondary pressure port 192, the second variable volume chamber distal secondary pressure port 192 distal from the second variable volume chamber primary pressure port 190, the second variable volume chamber primary pressure port 190 porting damper fluid from the second variable volume chamber 44 to a second variable volume chamber primary pressure valve actuation chamber 194 with a second variable volume chamber primary pressure actuation surface area $SSA_B$ of the fluid flow pressure sensing control valve assembly control valve 178, the second variable volume chamber distal secondary pressure port 192 porting damper fluid from the second variable volume working chamber 44 to a second variable volume chamber secondary pressure valve actuation chamber 196 with a second variable volume chamber secondary pressure actuation surface area $SSA_S$ of the fluid flow pressure sensing control valve assembly control valve 178. Preferably $FSA_B > FSA_S$ and $SSA_B > SSA_S$ wherein a working (contracting and expanding) of the first variable volume working chamber 42 and the second variable volume working chamber 44 by and at the rotor wing system operating frequency fluidly actuates the opening of the fluid flow pressure sensing control valve assembly control valve obstructing the damper fluid flow through the fluid damping flow valve controlled conduit 76", and a working (contracting and expanding) of the first variable volume working chamber and the second variable volume working chamber by the rotary wing system rotor blade natural frequency maintains the fluid flow pressure sensing control valve assembly control valve obstructing the damper fluid flow through the fluid damping flow valve controlled conduit 76".

Preferably the system includes a first spring 200 and a second spring 200', the first spring 200 and the second spring 200' resisting an actuation of the fluid flow pressure sensing control valve assembly control valve from a centered (obstructing) position centered about the fluid damping flow valve controlled conduit 76".

Preferably the system includes the fluid damping flow valve controlled conduit 76" is fluidly isolated from the fluid 32 in the first variable volume chamber primary pressure valve actuation chamber 184, the first variable volume chamber secondary pressure valve actuation chamber 186, the second variable volume chamber primary pressure valve actuation chamber 190, the second variable volume chamber secondary pressure valve actuation chamber 192 with the fluid flowing through the fluid damping flow valve controlled conduit 76" does not interact with the fluid in the first variable volume chamber primary pressure valve actuation chamber 184, the first variable volume chamber secondary pressure valve actuation chamber 186, the second variable volume chamber primary pressure valve actuation chamber 190, the second variable volume chamber secondary pressure valve actuation chamber 192. Preferably the components of fluid flow pressure sensing control valve assembly control valve and assembly are made with relatively tight tolerances and are closely matched and mated to inhibit fluid flow to provide such fluid isolation and inhibit such fluid flow interaction.

Preferably the system includes the fluid flow pressure sensing control valve assembly control valve 178 having a centered (obstructing) position centered about the fluid damping flow valve controlled conduit 76".

Preferably the system includes the fluid flow pressure sensing control valve assembly control valve 178 having a centered (obstructing) position centered about the fluid damping flow valve controlled conduit 76" and having a first valve controlled conduit side 300 and a second center opposing valve controlled conduit side 300' with the first variable volume chamber primary pressure valve actuation chamber 184 and the second variable volume chamber secondary pressure valve actuation chamber 196 oriented on the first valve controlled conduit side 300 and the first variable volume chamber secondary pressure valve actuation chamber 186 and the second variable volume chamber primary pressure valve actuation chamber 194 opposing oriented on the second center opposing valve controlled conduit side 300'.

Preferably the system includes the fluid flow pressure sensing control valve assembly control valve 178 has a centered (obstructing) position about the fluid damping flow valve controlled conduit 76" and having a first valve controlled conduit side 300 and a second center valve controlled conduit side 300' with the first variable volume chamber primary pressure valve actuation chamber and the second variable volume chamber secondary pressure valve actuation chamber oriented on the first valve controlled conduit side 300 and the first variable volume chamber secondary pressure valve actuation chamber and the second variable volume chamber primary pressure valve actuation chamber opposingly oriented on the second center opposing valve controlled conduit side 300' with a first spring 200 on the first valve controlled conduit side 300 and a second spring 200' on the second center opposing valve controlled conduit side 300'.

Preferably the system includes the first spring 200 disposed in the first variable volume chamber primary pressure valve actuation chamber 184 and the second spring 200' disposed in the second variable volume chamber primary pressure valve actuation chamber 194.

Preferably the system includes the fluid flow pressure sensing control valve assembly control valve 178 has a home (centered obstructing) position centered about the fluid damping flow valve controlled conduit 76" and has a first valve controlled conduit side 300 and a second center opposing valve controlled conduit side 300' with the first variable volume chamber primary pressure valve actuation chamber 184 and the second variable volume chamber secondary pressure valve actuation chamber 196 oriented on the first valve controlled conduit side 300 and the first variable volume chamber secondary pressure valve actuation chamber 186 and the second variable volume chamber primary pressure valve actuation chamber 194 opposing oriented on the second center opposing valve controlled conduit side 300' with the first variable volume chamber primary pressure valve actuation chamber 184 proximate the second variable volume chamber secondary pressure valve actuation chamber 196 and the first variable volume chamber secondary pressure valve actuation chamber 186 proximate the second variable volume chamber primary pressure valve actuation chamber 194.

Preferably the system includes the first variable volume chamber primary pressure valve actuation chamber 184 fluidly isolated from the second variable volume chamber secondary pressure valve actuation chamber 196.

Preferably the system includes the first variable volume chamber secondary pressure valve actuation chamber 186 fluidly isolated from the second variable volume chamber primary pressure valve actuation chamber 194.

Preferably the system includes the first variable volume chamber primary pressure valve actuation chamber 184 fluidly isolated from the second variable volume chamber secondary pressure valve actuation chamber 196 with the first variable volume chamber primary pressure valve actuation chamber 184 and the second variable volume chamber secondary pressure valve actuation chamber 196 concentrically oriented and nested.

Preferably the system includes the second variable volume chamber primary pressure valve actuation chamber 194 fluidly isolated from first variable volume chamber secondary pressure valve actuation chamber 186 with the second variable volume chamber primary pressure valve actuation chamber 194 fluidly concentrically oriented with the first variable volume chamber secondary pressure valve actuation chamber 186 and nested.

Preferably the system includes the fluid flow pressure sensing control valve assembly control valve 178 is longitudinally extending along a longitudinal valve center axis 500 and the fluid damping flow valve controlled conduit 76" is longitudinally extending along a longitudinal conduit center axis 502 with the longitudinal valve center axis offset to a side of the longitudinal conduit center axis.

Preferably the system includes the fluid flow pressure sensing control valve assembly control valve 178 is longitudinally extending along a longitudinal valve center axis 500 and the fluid damping flow valve controlled conduit 76" is longitudinally extending along a longitudinal conduit center axis 502 with the longitudinal valve center axis 500 oriented substantially normal to the longitudinal conduit center axis 502.

Preferably the system includes piston 78 (internal pumping mechanism piston) separating the first variable volume chamber 42 and the second variable volume chamber 44.

Preferably the system includes the piston 78 having a piston working longitudinal axis 504 with the fluid flow pressure sensing control valve assembly control valve longitudinally extending along a longitudinal valve center axis 500 with the longitudinal valve center axis 500 substantially normal to the piston working longitudinal axis 504.

Preferably the system includes the piston 78 having a piston working longitudinal axis 504 with the fluid damping flow valve controlled conduit 76" longitudinally extending along a longitudinal conduit axis 502 with the longitudinal axis 502 oriented relative to the piston working longitudinal axis 504. (substantially parallel and offset to a side of the a piston working longitudinal axis)

Preferably the system includes the piston 78 defining the fluid damping flow valve controlled conduit 76" and housing the first variable volume chamber secondary pressure valve actuation chamber 186 and the second variable volume chamber primary pressure valve actuation chamber 194 and the first variable volume chamber primary pressure valve actuation chamber 184 and the second variable volume chamber secondary pressure valve actuation chamber 196 and the fluid flow pressure sensing control valve assembly control valve 178 (and the springs 200,200').

Preferably the system includes $FSA_B$ substantially equal to $SSA_B$ and $FSA_S$ substantially equal to $SSA_S$ ($FSA_B=SSA_B$ and $FSA_S=SSA_S$).

Preferably the system includes the fluid damper 30 including the volume compensator channel in fluid communication with the damper fluid, the volume compensator channel including the centrifugal force mass member movable along a volume compensating length of the volume compensating channel, wherein a rotation about the rotation axis forces the centrifugal force mass member towards an outboard end of the volume compensating channel and pushes damper fluid from the volume compensator channel towards the variable volume chambers.

In an embodiment the invention includes a method for controlling a rotating blade, the method comprising: providing a rotating blade 22 which rotates about a rotation axis, and providing a fluid damper 30 with a damper fluid 32 in a first variable volume working chamber 42 and a second variable volume working chamber 44, with a fluid damping flow valve controlled conduit and a fluid flow pressure sensing control valve assembly 176 between the first variable volume working chamber 42 and the second variable volume working chamber 44. Preferably the fluid flow pressure sensing control valve assembly 176 having a fluid flow pressure sensing control valve assembly control valve 178 for obstructing a damper fluid flow through the fluid damping flow valve controlled conduit 76", a first variable volume chamber primary pressure port 180 and a first variable volume chamber distal secondary pressure port 182, the first variable volume chamber distal secondary pressure port 182 distal from the first variable volume chamber primary pressure port 180, the first variable volume chamber primary pressure port 180 porting damper fluid 32 from the first variable volume chamber to a first variable volume chamber primary pressure valve actuation chamber 184 with a first variable volume chamber primary pressure actuation surface area $FSA_B$ of the fluid flow pressure sensing control valve assembly control valve 178, the first variable volume chamber distal secondary pressure port 182 porting damper fluid 32 from the first variable volume chamber to a first variable volume chamber secondary pressure valve actuation chamber 186 with a first variable volume chamber secondary pressure actuation surface area $FSA_S$ of the fluid flow pressure sensing control valve assembly control valve 178, a second variable volume chamber primary pressure port 190 and a second variable volume chamber distal secondary pressure port 192, the second variable volume chamber distal secondary pressure port distal from the second variable volume chamber primary pressure port, the second variable volume chamber primary pressure port 190 porting damper fluid 32 from the second variable volume chamber to a second variable volume chamber primary pressure valve actuation chamber 194 with a second variable volume chamber primary pressure actuation surface area $SSA_B$ of the fluid flow pressure sensing control valve assembly control valve 178, the second variable volume chamber distal secondary pressure port 192 porting damper fluid 32 from the second variable volume chamber to a second variable volume chamber secondary pressure valve actuation chamber 196 with a second variable volume chamber secondary pressure actuation surface area $SSA_S$ of the fluid flow pressure sensing control valve assembly control valve 178 with $FSA_B>FSA_S$ and $SSA_B>SSA_S$. Preferably a working contracting and expanding of the first variable volume chamber and the second variable volume chamber at a sustained rotating blade system operating frequency fluidly actuates the opening of the fluid flow pressure sensing control valve assembly control valve 178 obstructing the damper fluid 32 flow through the fluid damping flow valve controlled conduit, and a working contracting and expanding of the first variable volume chamber and the second variable volume chamber at a troublesome rotor blade natural frequency maintains the fluid flow pressure sensing control valve assembly control valve 178 obstructing the damper fluid flow through the fluid damping flow valve controlled conduit (sustained rotating blade system operating frequency different than the troublesome rotor blade natural frequency).

Preferably the method includes providing a first spring 200 and a second spring 200', the first spring 200 and the second spring 200' resisting an actuation of the fluid flow pressure sensing control valve assembly control valve 178 from a centered (obstructing) position centered about the fluid damping flow valve controlled conduit.

Preferably the method includes the fluid damping flow valve controlled conduit 76" is fluidly isolated from the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196 with the fluid flowing through the fluid damping flow valve controlled conduit 76" inhibited from interacting with the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196

Preferably the method includes the fluid flow pressure sensing control valve assembly control valve 178 has a centered (obstructing) position centered about the fluid damping flow valve controlled conduit.

Preferably the method includes the fluid flow pressure sensing control valve assembly control valve 178 has a centered (obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side.

Preferably the method includes the fluid flow pressure sensing control valve assembly control valve 178 has a centered (obstructing) position about the fluid damping flow valve controlled conduit 76" and has a first valve controlled conduit side and a second center valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposingly oriented on the second center opposing valve controlled conduit side with a first spring 200 on the first valve controlled conduit side and a second spring 200' on the second center opposing valve controlled conduit side.

Preferably the method includes the first spring 200 disposed in the first variable volume chamber primary pressure valve actuation chamber 184 and the second spring 200' disposed in the second variable volume chamber primary pressure valve actuation chamber 194.

Preferably the method includes the fluid flow pressure sensing control valve assembly control valve 178 has a spring preloaded home (initial) (centered obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side with the first variable volume chamber primary pressure valve actuation chamber 184 proximate the second variable volume chamber secondary pressure valve actuation chamber 196 and the first variable volume chamber secondary pressure valve actuation chamber 186 proximate the second variable volume chamber primary pressure valve actuation chamber 194.

Preferably the method includes the first variable volume chamber primary pressure valve actuation chamber 184 fluidly isolated from the second variable volume chamber secondary pressure valve actuation chamber 196.

Preferably the method includes the first variable volume chamber secondary pressure valve actuation chamber 186 fluidly isolated from the second variable volume chamber primary pressure valve actuation chamber 194.

Preferably the method includes the first variable volume chamber primary pressure valve actuation chamber 184 fluidly isolated from the second variable volume chamber secondary pressure valve actuation chamber 196 with the first variable volume chamber primary pressure valve actuation chamber 184 and the second variable volume chamber secondary pressure valve actuation chamber 196 concentrically oriented (nested).

Preferably the method includes second variable volume chamber primary pressure valve actuation chamber 194 fluidly isolated from first variable volume chamber secondary pressure valve actuation chamber 186 with the second variable volume chamber primary pressure valve actuation chamber 194 fluidly concentrically oriented with the first variable volume chamber secondary pressure valve actuation chamber and nested.

Preferably the method includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis off set to a side of the longitudinal conduit center axis.

Preferably the method includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis oriented substantially normal to the longitudinal conduit center axis.

Preferably the method includes a piston (internal pumping mechanism piston) separating the first variable volume chamber and the second variable volume chamber.

Preferably the method includes the piston having a piston working longitudinal axis with the fluid flow pressure sensing control valve assembly control valve 178 longitudinally extending along a longitudinal valve center axis with the longitudinal valve center axis substantially normal to the piston working longitudinal axis.

Preferably the method includes the piston having a piston working longitudinal axis with the fluid damping flow valve controlled conduit 76" longitudinally extending along a longitudinal conduit axis with the longitudinal valve axis oriented relative to the piston working longitudinal axis (substantially parallel and offset to a side of the a piston working longitudinal axis).

Preferably the method includes the piston defining the fluid damping flow valve controlled conduit 76" and housing the first variable volume chamber secondary pressure valve actuation chamber 186 and the second variable volume chamber primary pressure valve actuation chamber 194 and the first variable volume chamber primary pressure valve actuation chamber 184 and the second variable volume chamber secondary pressure valve actuation chamber 196 and the fluid flow pressure sensing control valve assembly control valve 178 (and the springs).

Preferably the method includes $FSA_B$ substantially equal to $SSA_B$ and $FSA_S$ substantially equal to $SSA_S$ ($FSA_B$=$SSA_B$ and $FSA_S$=$SSA_S$).

Preferably the method includes the fluid damper 30 including a volume compensator channel in fluid communication with the damper fluid 32, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid 32 from the volume compensator channel towards the variable volume chambers.

In an embodiment the invention includes a rotating blade damper for a blade 22 rotating about a rotation axis, the blade damper including a damper fluid 32 in a first variable volume chamber and a second variable volume chamber, with a fluid damping flow valve controlled conduit 76" and a fluid flow pressure sensing control valve assembly 176 between the first variable volume chamber and the second variable volume chamber. Preferably the fluid flow pressure sensing control valve assembly 176 having a fluid flow pressure sensing control valve assembly control valve 178 for obstructing a damper fluid flow through the fluid damping flow valve controlled conduit, a first variable volume chamber primary pressure port 180 and a first variable volume chamber distal secondary pressure port 182, the first variable volume chamber distal secondary pressure port distal from the first variable volume chamber primary pressure port 180, the first variable volume chamber primary pressure port 180 porting damper fluid 32 from the first variable volume chamber to a first variable volume chamber primary pressure valve actuation chamber 184 with a first variable volume chamber primary pressure actuation surface area $FSA_B$ of the fluid flow pressure sensing control valve assembly control valve 178, the first variable volume chamber distal secondary pressure port 182 porting damper fluid 32 from the first variable volume chamber to a first variable volume chamber secondary pressure valve actuation chamber 186 with a first variable volume chamber secondary pressure actuation surface area $FSA_S$ of the fluid flow pressure sensing control valve assembly control valve 178, a second variable volume chamber primary pressure port 190 and a second variable volume chamber distal secondary pressure port 192, the second variable volume chamber distal secondary pressure port distal from the second variable volume chamber primary pressure port 190, the second variable volume chamber primary pressure port 190 porting damper fluid 32 from the second variable volume chamber to a second variable volume chamber primary pressure valve actuation chamber 194 with a second variable volume chamber primary pressure actuation surface area $SSA_B$ of the fluid flow pressure sensing control valve assembly control valve 178, the second variable volume chamber distal secondary pressure port 192 porting damper fluid 32 from the second variable volume chamber to a second variable volume chamber secondary pressure valve actuation chamber 196 with a second variable volume chamber secondary pressure actuation surface area $SSA_S$ of the fluid flow pressure sensing control valve assembly control valve 178, with the fluid flow pressure sensing control valve assembly 176 sensing a sustained rotating blade operating frequency dynamic pressure difference between the first variable volume chamber and the second variable volume chamber actuates the opening of the fluid flow pressure sensing control valve assembly control valve 178 obstructing the damper fluid flow through the fluid damping flow valve controlled conduit, and a working (contracting and expanding) of the first variable volume chamber and the second variable volume chamber by a troublesome rotor blade natural frequency maintains the fluid flow pressure sensing control valve assembly control valve 178 obstructing the damper fluid flow through the fluid damping flow valve controlled conduit.

Preferably the damper includes $FSA_B$>$FSA_S$ and $SSA_B$>$SSA_S$.

Preferably the damper includes a first spring 200 and a second spring 200', the first spring 200 and the second spring 200' resisting an actuation of the fluid flow pressure sensing control valve assembly control valve 178 from a centered (obstructing) position centered about the fluid damping flow valve controlled conduit.

Preferably the damper includes the fluid damping flow valve controlled conduit 76" is fluidly isolated from the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196 with the fluid flowing through the fluid damping flow valve controlled conduit 76" does not interact with the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196.

Preferably the damper includes the fluid flow pressure sensing control valve assembly control valve 178 has a centered (obstructing) position centered about the fluid damping flow valve controlled conduit.

Preferably the damper includes the fluid flow pressure sensing control valve assembly control valve 178 has a centered (obstructing) position centered about the fluid damping flow valve controlled conduit 76" and having a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side.

Preferably the damper includes the fluid flow pressure sensing control valve assembly control valve 178 has a centered (obstructing) position about the fluid damping flow valve controlled conduit 76" and having a first valve controlled conduit side and a second center valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposingly oriented on the second center opposing valve controlled conduit side with a first spring 200 on the first valve controlled conduit side and a second spring 200' on the second center opposing valve controlled conduit side.

Preferably the damper includes the first spring 200 disposed in the first variable volume chamber primary pressure valve actuation chamber 184 and the second spring 200' disposed in the second variable volume chamber primary pressure valve actuation chamber 194.

Preferably the damper includes the fluid flow pressure sensing control valve assembly control valve 178 has a home (centered obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side with the first variable volume chamber primary pressure valve actuation chamber 184 proximate the second variable volume chamber secondary pressure valve actuation chamber 196 and the first variable volume chamber secondary pressure valve actuation chamber 186 proximate the second variable volume chamber primary pressure valve actuation chamber 194.

Preferably the damper includes the first variable volume chamber primary pressure valve actuation chamber 184 fluidly isolated from the second variable volume chamber secondary pressure valve actuation chamber 196.

Preferably the damper includes the first variable volume chamber secondary pressure valve actuation chamber 186 fluidly isolated from the second variable volume chamber primary pressure valve actuation chamber 194.

Preferably the damper includes the first variable volume chamber primary pressure valve actuation chamber 184 fluidly isolated from the second variable volume chamber secondary pressure valve actuation chamber 196 with the first variable volume chamber primary pressure valve actuation chamber 184 and the second variable volume chamber secondary pressure valve actuation chamber 196 concentrically oriented (nested).

Preferably the damper includes the second variable volume chamber primary pressure valve actuation chamber 194 fluidly isolated from first variable volume chamber secondary pressure valve actuation chamber with the second variable volume chamber primary pressure valve actuation chamber 194 fluidly concentrically oriented with the first variable volume chamber secondary pressure valve actuation chamber (nested).

Preferably the damper includes fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis off set to a side of the longitudinal conduit center axis.

Preferably the damper includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis oriented substantially normal to the longitudinal conduit center axis.

Preferably the damper includes a piston (internal pumping mechanism piston) separating the first variable volume chamber and the second variable volume chamber.

Preferably the damper includes the piston having a piston working longitudinal axis with the fluid flow pressure sensing control valve assembly control valve 178 longitudinally extending along a longitudinal valve center axis with the longitudinal valve center axis substantially normal to the piston working longitudinal axis.

Preferably the damper includes the piston having a piston working longitudinal axis with the fluid damping flow valve controlled conduit 76" longitudinally extending along a longitudinal conduit axis with the longitudinal valve axis oriented relative to the piston working longitudinal axis (substantially parallel and offset to a side of the a piston working longitudinal axis).

Preferably the damper includes the piston defining the fluid damping flow valve controlled conduit 76" and housing the first variable volume chamber secondary pressure valve actuation chamber 186 and the second variable volume chamber primary pressure valve actuation chamber 194 and the first variable volume chamber primary pressure valve actuation chamber 184 and the second variable volume chamber secondary pressure valve actuation chamber 196 and the fluid flow pressure sensing control valve assembly control valve 178 (and the springs).

Preferably the damper includes $FSA_B$ substantially equal to $SSA_B$ and $FSA_S$ substantially equal to $SSA_S$ ($FSA_B=SSA_B$ and $FSA_S=SSA_S$).

Preferably the damper includes the fluid damper 30 including a volume compensator channel in fluid communication with the damper fluid 32, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid 32 from the volume compensator channel towards the variable volume chambers.

In an embodiment the invention includes a damper, the damper including a damper fluid 32 in a first variable volume chamber and a second variable volume chamber, with a fluid damping flow valve controlled conduit 76" and a fluid flow pressure sensing control valve assembly 176 between the first variable volume chamber and the second variable volume chamber, the fluid flow pressure sensing control valve assembly 176 having a fluid flow pressure sensing control valve assembly control valve 178 for obstructing a damper fluid flow through the fluid damping flow valve controlled conduit, a first variable volume chamber primary pressure port 180 and a first variable volume chamber distal secondary pressure port 182, the first variable volume chamber distal secondary pressure port 182 distal from the first variable volume chamber primary pressure port 180, the first variable volume chamber primary pressure port 180 porting damper fluid 32 from the first variable volume chamber to a first variable volume chamber primary pressure valve actuation chamber 184 with a first variable volume chamber primary pressure actuation surface area $FSA_B$ of the fluid flow pressure sensing control valve assembly control valve 178, the first variable volume chamber distal secondary pressure port 182 porting damper fluid 32 from the first variable volume chamber to a first variable volume chamber secondary pressure valve actuation chamber 186 with a first variable volume chamber secondary pressure actuation surface area $FSA_S$ of the fluid flow pressure sensing control valve assembly control valve 178, a second variable volume chamber primary pressure port 190 and a second variable volume chamber distal secondary pressure port 192, the second variable volume chamber distal secondary pressure port distal from the second variable volume chamber primary pressure port 190, the second variable volume chamber primary pressure port 190 porting damper fluid 32 from the second variable volume chamber to a second variable volume chamber primary pressure valve actuation chamber 194 with a second variable volume chamber primary pressure actuation surface area $SSA_B$ of the fluid flow pressure sensing control valve assembly control valve 178, the second variable volume chamber distal secondary pressure port 192 porting damper fluid 32 from the second variable volume chamber to a second variable volume chamber secondary pressure valve actuation chamber 196 with a second variable volume chamber secondary pressure actuation surface area $SSA_S$ of the fluid flow pressure sensing control valve assembly control valve 178, with $FSA_B > FSA_S$ and $SSA_B > SSA_S$ wherein a working contracting and expanding of the first variable volume chamber and the second variable volume chamber at a first (sustained rotating blade system) operating condition actuates the opening of the fluid flow pressure sensing control valve assembly control valve 178 obstructing the damper fluid flow through the fluid damping flow valve controlled conduit, and a working contracting and expanding of the first variable volume chamber and the second variable volume chamber at a troublesome condition maintains the fluid flow pressure sensing control valve assembly control valve 178 obstructing the damper fluid flow through the fluid damping flow valve controlled conduit. (sustained rotating blade system operating frequency different than the troublesome rotor blade natural frequency) with the fluid flow pressure sensing control valve assembly 176 sensing a sustained rotating blade operating frequency dynamic pressure difference between the first variable volume chamber and the second variable volume chamber actuates the opening of the fluid flow pressure sensing control valve assembly control valve 178 obstructing the damper fluid 32 flow through the fluid damping flow valve controlled conduit, and a working (contracting and expanding) of the first variable volume chamber and the second variable volume chamber by a troublesome rotor blade natural frequency maintains the fluid flow pressure sensing control valve assembly control valve 178 obstructing the damper fluid flow through the fluid damping flow valve controlled conduit.

Preferably the damper includes a first spring 200 and a second spring 200', the first spring 200 and the second spring 200' resisting an actuation of the fluid flow pressure sensing control valve assembly control valve 178 from a centered (obstructing) position centered about the fluid damping flow valve controlled conduit.

Preferably the damper includes the fluid damping flow valve controlled conduit 76" is fluidly isolated from the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196 with the fluid flowing through the fluid damping flow valve controlled conduit 76" does not interact with the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196.

Preferably the damper includes the fluid flow pressure sensing control valve assembly control valve 178 has a centered (obstructing) position centered about the fluid damping flow valve controlled conduit.

Preferably the damper includes the fluid flow pressure sensing control valve assembly control valve 178 has a centered (obstructing) position centered about the fluid damping flow valve controlled conduit 76" and having a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side.

Preferably the damper includes the fluid flow pressure sensing control valve assembly control valve 178 has a centered (obstructing) position about the fluid damping flow valve controlled conduit 76" and having a first valve controlled conduit side and a second center valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposingly oriented on the second center opposing valve controlled conduit side with a first spring 200 on the first valve controlled conduit side and a second spring 200' on the second center opposing valve controlled conduit side.

Preferably the damper includes the first spring 200 disposed in the first variable volume chamber primary pressure valve actuation chamber 184 and the second spring 200' disposed in the second variable volume chamber primary pressure valve actuation chamber 194.

Preferably the damper includes the fluid flow pressure sensing control valve assembly control valve 178 has a home (centered obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side with the first variable volume chamber primary pressure valve actuation chamber 184 proximate the second variable volume chamber secondary pressure valve actuation chamber 196 and the first variable volume chamber secondary pressure valve actuation chamber 186 proximate the second variable volume chamber primary pressure valve actuation chamber 194.

Preferably the damper includes the first variable volume chamber primary pressure valve actuation chamber 184 fluidly isolated from the second variable volume chamber secondary pressure valve actuation chamber 196.

Preferably the damper includes the first variable volume chamber secondary pressure valve actuation chamber 186 fluidly isolated from the second variable volume chamber primary pressure valve actuation chamber 194.

Preferably the damper includes the first variable volume chamber primary pressure valve actuation chamber 184 fluidly isolated from the second variable volume chamber secondary pressure valve actuation chamber 196 with the first variable volume chamber primary pressure valve actuation chamber 184 and the second variable volume chamber secondary pressure valve actuation chamber 196 concentrically oriented (nested).

Preferably the damper includes with the second variable volume chamber primary pressure valve actuation chamber 194 fluidly isolated from first variable volume chamber secondary pressure valve actuation chamber 186 with the second variable volume chamber primary pressure valve actuation chamber 194 fluidly concentrically oriented with the first variable volume chamber secondary pressure valve actuation chamber 186 (nested).

Preferably the damper includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis off set to a side of the longitudinal conduit center axis.

Preferably the damper includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis oriented substantially normal to the longitudinal conduit center axis.

Preferably the damper includes with a piston (internal pumping mechanism piston) separating the first variable volume chamber and the second variable volume chamber.

Preferably the damper includes with the piston having a piston working longitudinal axis with the fluid flow pressure sensing control valve assembly control valve 178 longitudinally extending along a longitudinal valve center axis with the longitudinal valve center axis substantially normal to the piston working longitudinal axis.

Preferably the damper includes the piston having a piston working longitudinal axis with the fluid damping flow valve controlled conduit 76" longitudinally extending along a longitudinal conduit axis with the longitudinal valve axis oriented relative to the piston working longitudinal axis (substantially parallel and offset to a side of the a piston working longitudinal axis).

Preferably the damper includes the piston defining the fluid damping flow valve controlled conduit 76" and housing the first variable volume chamber secondary pressure valve actuation chamber 186 and the second variable volume chamber primary pressure valve actuation chamber 194 and the first variable volume chamber primary pressure valve actuation chamber 184 and the second variable volume chamber secondary pressure valve actuation chamber 196 and the fluid flow pressure sensing control valve assembly control valve 178 (and the springs).

Preferably the damper includes $FSA_B$ substantially equal to $SSA_B$ and $FSA_S$ substantially equal to $SSA_S$ ($FSA_B$=$SSA_B$ and $FSA_S$=$SSA_S$)

Preferably the damper includes the fluid damper 30 including a volume compensator channel in fluid communication with the damper fluid 32, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid 32 from the volume compensator channel towards the variable volume chambers.

In an embodiment the invention includes a damper, the damper including a damper fluid 32 in a first variable volume chamber and a second variable volume chamber, with a fluid damping flow valve controlled conduit 76" and a fluid flow pressure sensing control valve assembly 176 between the first variable volume chamber and the second variable volume chamber, the fluid flow pressure sensing control valve assembly 176 having a fluid flow pressure sensing control valve assembly control valve 178 for obstructing a damper fluid flow through the fluid damping flow valve controlled conduit, a pressure sensing valve actuating means for sensing a pressure difference between the first variable volume chamber and the second variable volume chamber and actuating the fluid flow pressure sensing control valve assembly control valve 178 obstructing the damper fluid flow through the fluid damping flow valve controlled conduit 76" wherein a working contracting and expanding of the first variable volume chamber and the second variable volume chamber at a first (sustained rotating blade system) operating condition actuates the opening of the fluid flow pressure sensing control valve assembly control valve 178 obstructing the damper fluid flow through the fluid damping flow valve controlled conduit, and a working contracting and expanding of the first variable volume chamber and the second variable volume chamber at a troublesome condition maintains the fluid flow pressure sensing control valve assembly control valve 178 obstructing the damper fluid flow through the fluid damping flow valve controlled conduit (sustained rotating blade system operating frequency different than the troublesome rotor blade natural frequency).

In an embodiment the invention includes a method for making a fluid damper 30 with a first variable volume working chamber 42 and a second variable volume working chamber 44. The method comprising providing a first variable volume fluid damper working chamber and a second variable volume fluid damper working chamber, and providing a fluid damping flow valve controlled conduit 76" and a fluid flow pressure sensing control valve assembly 176 between the first variable volume working chamber 42 and the second variable volume working chamber 44.

Preferably the damper fluid flow pressure sensing control valve assembly 176 includes a fluid flow pressure sensing control valve assembly control valve 178 for obstructing a damper fluid flow through the fluid damping flow valve controlled conduit, a first variable volume chamber primary pressure port 180 and a first variable volume chamber distal secondary pressure port 182, the first variable volume chamber distal secondary pressure port distal from the first variable volume chamber primary pressure port 180, the first variable volume chamber primary pressure port 180 porting damper fluid 32 from the first variable volume chamber to a first variable volume chamber primary pressure valve actuation chamber 184 with a first variable volume chamber primary pressure actuation surface area $FSA_B$ of the fluid flow pressure sensing control valve assembly control valve 178, the first variable volume chamber distal secondary pressure port 182 porting damper fluid 32 from the first variable volume chamber to a first variable volume chamber secondary pressure valve actuation chamber 186 with a first variable volume chamber secondary pressure actuation surface area $FSA_S$ of the fluid flow pressure sensing control valve assembly control valve 178, a second variable volume chamber primary pressure port 190 and a second variable volume chamber distal secondary pressure port 192, the second variable volume chamber distal secondary pressure port distal from the second variable volume chamber primary pressure port 190, the second variable volume chamber primary pressure port 190 porting damper fluid 32 from the second variable volume chamber to a second variable volume chamber primary pressure valve actuation chamber 194 with a second variable volume chamber primary pressure actuation surface area $SSA_B$ of the fluid flow pressure sensing control valve assembly control valve 178, the second variable volume chamber distal secondary pressure port 192 porting damper fluid 32 from the second variable volume chamber to a second variable volume chamber secondary pressure valve actuation chamber 196 with a second variable volume chamber secondary pressure actuation surface area $SSA_S$ of the fluid flow pressure sensing control valve assembly control valve 178, with $FSA_B > FSA_S$ and $SSA_B > SSA_S$, wherein a working contracting and expanding of the first variable volume chamber and the second variable volume chamber at a first system operating frequency fluidly actuates the opening of the fluid flow pressure sensing control valve assembly control valve 178 obstructing the damper fluid flow through the fluid damping flow valve controlled conduit, and a working contracting and expanding of the first variable volume chamber and the second variable volume chamber at a second system frequency maintains the fluid flow pressure sensing control valve assembly control valve 178 obstructing the damper fluid flow through the fluid damping flow valve controlled conduit (sustained rotating blade system operating frequency different than the troublesome rotor blade natural frequency).

Preferably the method includes providing a first spring 200 and a second spring 200', the first spring 200 and the second spring 200' resisting an actuation of the fluid flow pressure sensing control valve assembly control valve 178 from a centered (obstructing) position centered about the fluid damping flow valve controlled conduit.

Preferably the method includes the fluid damping flow valve controlled conduit 76" is fluidly isolated from the fluid in the first variable volume chamber primary pressure valve actuation chamber 184, the first variable volume chamber secondary pressure valve actuation chamber 186, the second variable volume chamber primary pressure valve actuation chamber 194, the second variable volume chamber secondary pressure valve actuation chamber 196 with the fluid flowing through the fluid damping flow valve controlled conduit 76" inhibited from interacting with the fluid in the first variable volume chamber primary pressure valve actuation chamber 184, the first variable volume chamber secondary pressure valve actuation chamber 186, the second variable volume chamber primary pressure valve actuation chamber 194, and the second variable volume chamber secondary pressure valve actuation chamber 196.

Preferably the method includes the fluid flow pressure sensing control valve assembly control valve 178 has a centered (obstructing) position centered about the fluid damping flow valve controlled conduit.

Preferably the method includes the fluid flow pressure sensing control valve assembly control valve 178 has a centered (obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side.

Preferably the method includes the fluid flow pressure sensing control valve assembly control valve 178 has a centered (obstructing) position about the fluid damping flow valve controlled conduit and has a first valve controlled conduit side and a second center valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposingly oriented on the second center opposing valve controlled conduit side with a first spring 200 on the first valve controlled conduit side and a second spring 200' on the second center opposing valve controlled conduit side.

Preferably the method includes the first spring 200 disposed in the first variable volume chamber primary pressure valve actuation chamber 184 and the second spring 200' disposed in the second variable volume chamber primary pressure valve actuation chamber 194.

Preferably the method includes the fluid flow pressure sensing control valve assembly control valve 178 has a spring preloaded home (initial) (centered obstructing) position centered about the fluid damping flow valve controlled conduit 76" and has a first valve controlled conduit side and a second center opposing valve controlled conduit side with the first variable volume chamber primary pressure valve actuation chamber 184 and the second variable volume chamber secondary pressure valve actuation chamber 196 oriented on the first valve controlled conduit side and the first variable volume chamber secondary pressure valve actuation chamber 186 and the second variable volume chamber primary pressure valve actuation chamber 194 opposing oriented on the second center opposing valve controlled conduit side with the first variable volume chamber primary pressure valve actuation chamber 184 proximate the second variable volume chamber secondary pressure valve actuation chamber 196 and the first variable volume chamber secondary pressure valve actuation chamber 186 proximate the second variable volume chamber primary pressure valve actuation chamber 194.

Preferably the method includes the first variable volume chamber primary pressure valve actuation chamber 184 fluidly isolated from the second variable volume chamber secondary pressure valve actuation chamber 196.

Preferably the method includes the first variable volume chamber secondary pressure valve actuation chamber 186 fluidly isolated from the second variable volume chamber primary pressure valve actuation chamber 194.

Preferably the method includes the first variable volume chamber primary pressure valve actuation chamber 184 fluidly isolated from the second variable volume chamber secondary pressure valve actuation chamber 196 with the first variable volume chamber primary pressure valve actuation chamber 184 and the second variable volume chamber secondary pressure valve actuation chamber 196 concentrically oriented (nested).

Preferably the method includes the second variable volume chamber primary pressure valve actuation chamber 194 fluidly isolated from first variable volume chamber secondary pressure valve actuation chamber 186 with the second variable volume chamber primary pressure valve actuation chamber 194 fluidly concentrically oriented with the first variable volume chamber secondary pressure valve actuation chamber 186 (nested).

Preferably the method includes the fluid flow pressure sensing control valve assembly control valve 178 is longitudinally extending along a longitudinal valve center axis and the fluid damping flow valve controlled conduit 76" is longitudinally extending along a longitudinal conduit center axis with the longitudinal valve center axis off set to a side of the longitudinal conduit center axis.

Preferably the method includes the fluid flow pressure sensing control valve assembly control valve 178 is longitudinally extending along a longitudinal valve center axis and the fluid damping flow valve controlled conduit is longitudinally extending along a longitudinal conduit center axis with the longitudinal valve center axis oriented substantially normal to the longitudinal conduit center axis.

Preferably the method includes a piston (internal pumping mechanism piston) separating the first variable volume chamber and the second variable volume chamber.

Preferably the method includes the piston having a piston working longitudinal axis with the fluid flow pressure sensing control valve assembly control valve 178 longitudinally extending along a longitudinal valve center axis with the longitudinal valve center axis substantially normal to the piston working longitudinal axis.

Preferably the method includes the piston having a piston working longitudinal axis with the fluid damping flow valve controlled conduit 76" longitudinally extending along a longitudinal conduit axis with the longitudinal valve axis oriented relative to the piston working longitudinal axis (substantially parallel and offset to a side of the a piston working longitudinal axis).

Preferably the method includes the piston defining the fluid damping flow valve controlled conduit 76" and housing the first variable volume chamber secondary pressure valve actuation chamber 186 and the second variable volume chamber primary pressure valve actuation chamber 194 and the first variable volume chamber primary pressure valve actuation chamber 184 and the second variable volume chamber secondary pressure valve actuation chamber 196 and the fluid flow pressure sensing control valve assembly control valve 178 (and the springs).

Preferably the method includes $FSA_B$ substantially equal to $SSA_B$ and $FSA_S$ substantially equal to $SSA_S$ ($FSA_B=SSA_B$ and $FSA_S=SSA_S$).

Preferably the method includes the fluid damper 30 including a volume compensator channel in fluid communication with the damper fluid 32, the volume compensator channel including a centrifugal force mass member movable along a volume compensating length of the volume compensating channel, wherein a rotation about the rotation axis forces the centrifugal force mass member towards an outboard end of the volume compensating channel and pushes damper fluid 32 from the volume compensator channel towards the variable volume chambers.

Preferably with the fluid flow pressure sensing control valve assembly the valve and damper fluid flow control orifice senses fluid pressure differences in the dynamic fluid chambers of the elastomeric fluid damper. The dynamic pressures are ported to primary and secondary reaction areas to control the valve displacement.

The dynamic pressure differences react against the primary reaction areas of the control valve which displaces the valve and changes the orifice area to reduce, maintain or increase fluid flow through the orifice conduit. The dynamic pressure differences react against the primary reaction areas of the control valve which displaces the valve and changes the orifice area to reduce, maintain or increase fluid flow through the orifice conduit to provide a means for controlling fluid flow through the conduit and between the variable volume working chambers. The dynamic pressures are preferably counter balanced by the secondary reaction surfaces to minimize actuation forces and allow the use of lighter components. Preferably high dynamic pressures (>1000 psi) are seen with the springs still having low spring forces. Preferably the fluid flow pressure sensing control valve assembly inhibits chatter. The control valve orifice area in the conduit has an initial size achieved by the off-setting the main orifice from the centerline of the control valve. The control valve overlaps a portion of the main orifice area while the remaining portion is unobstructed to allow fluid flow. As the control valve is actuated form the initial spring loaded centered home position, the main orifice area can be modified to reduce, maintain or increase the main orifice area by contouring and shaping of the control valve. This contouring of the control valve allows the orifice area to be changed for specific requirements.

The pressure forces in the orifice restriction are equalized to prevent unwanted control valve actuation by the dynamic pressures in the main orifice. Equalization is accomplished by incorporation of pressure reaction areas in the control valve which are equal to the valve area exposed to the main orifice pressure.

The control valve is preferably located within the main damper piston which separates the two dynamic fluid chambers having the variable working volumes. This provides for a control valve functioning in a bi-directional manor. The control valve is preferably symmetrical and positioned by two springs which are pre-loaded against the control valve and retained by retainers on both ends. The retainers act as guides for the control valve to position it within the piston. They are preferably manufactured from a bearing grade material with low friction. Porting through the retainers allows fluid pressure to react on the main reaction areas. Preferably with the fluid flow pressure sensing control valve assembly is double acting with fluid flow through the conduit 76" controlled in both directions. Additional fluid pressure ports are incorporated within the piston to allow fluid pressure to react against the secondary reaction areas.

The primary and secondary reaction areas are isolated from each other by means of close tolerance fits between the control valve, the main piston and retainer/guides that restrict the fluid flow and communication.

This preferably provides a helicopter damper fluid flow control orifice to maximize damping forces (dynamic pressures) at the rotor blade natural frequency and reduce the damping forces (dynamic pressures) at the sustained operating frequency in flight and provides for adjustments to change the total damper force for specific inputs/frequencies, and preferably tuning of the helicopter structural loads at the sustained operating frequency in flight. Preferably the fluid elastomeric damper fluid flow control orifice senses fluid pressure differences in the dynamic fluid chambers, with the dynamic pressure differences reacting against the control valve which displaces the valve and changes the orifice area to either reduce, maintain, or increase fluid flow through the conduit orifice. The fluid pressures are preferably counter balanced by the control valve design to control the actuation forces. The pressure forces in the orifice restriction are preferably equalized to prevent unwanted valve actuation by the dynamic pressures being controlled. Preferably the control valve assembly is disposed within the main damper piston separating the dynamic fluid variable volume working chambers providing one symmetrical control valve to function in a bi-directional manor and minimizes components and improves system reliability.

In an embodiment the invention includes a damper, the damper comprised of a pumping mechanism piston for working damper fluid between a first variable volume fluid damper working chamber and a second variable volume fluid damper working chamber, and a means for controlling fluid flow between the first variable volume working chamber and the second variable volume working chamber.

In an embodiment the invention includes a fluid flow pressure sensing control valve assembly for controlling a fluid flow through a controlled conduit, the fluid flow pressure sensing control valve assembly having a fluid flow pressure sensing control valve assembly control valve for obstructing a fluid flow through the controlled conduit, a first chamber primary pressure port and a first chamber distal secondary pressure port, the first chamber distal secondary pressure port distal from the first chamber primary pressure port, the first chamber primary pressure port porting damper fluid from the first chamber to a first chamber primary pressure valve actuation chamber with a first chamber primary pressure actuation surface area FSAB of the fluid flow pressure sensing control valve assembly control valve, the first chamber distal secondary pressure port porting damper fluid from the first chamber to a first chamber secondary pressure valve actuation chamber with a first chamber secondary pressure actuation surface area FSAS of the fluid flow pressure sensing control valve assembly control valve, a second chamber primary pressure port and a second chamber distal secondary pressure port, the second chamber distal secondary pressure port distal from the second chamber primary pressure port, the second chamber primary pressure port porting damper fluid from the second chamber to a second chamber primary pressure valve actuation chamber with a second chamber primary pressure actuation surface area SSAB of the fluid flow pressure sensing control valve assembly control valve, the second chamber distal secondary pressure port porting damper fluid from the second chamber to a second chamber secondary pressure valve actuation chamber with a second chamber secondary pressure actuation surface area SSAS of the fluid flow pressure sensing control valve assembly control valve, with FSAB>FSAS and SSAB>SSAS.

In an embodiment the invention includes a system for controlling motion, the system including a fluid damper with a damper fluid in a first variable volume chamber and a second variable volume chamber, and a means for controlling fluid flow between the first variable volume working chamber and the second variable volume working chamber.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. A fluid flow pressure sensing control valve assembly (176) for controlling a fluid flow through a fluid damping controlled conduit (76"), said fluid flow pressure sensing control valve assembly (176) comprises:
    a control valve (178) for obstructing a fluid flow through said fluid damping controlled conduit (76");
    a first chamber primary pressure port (180) and a first secondary pressure port (182),
        said first secondary pressure port (182) distal from said first chamber primary pressure port (180),
        said first chamber primary pressure port (180) configured to directly port a damper fluid (32) from a first variable volume working chamber (42) to a first primary pressure valve actuation chamber (184) with a first primary pressure actuation surface area $FSA_B$ of said control valve (178),
        said first secondary pressure port (182) configured to directly port said damper fluid (32) from said first variable volume working chamber (42) to a first secondary pressure valve actuation chamber (186) with a first secondary pressure actuation surface area $FSA_S$ of said control valve (178); and
    a second primary pressure port (190) and a second secondary pressure port (192),
        said second secondary pressure port (192) distal from said second primary pressure port (190),
        said second primary pressure port (190) configured to directly port said damper fluid (32) from a second variable volume working chamber (44) to a second primary pressure valve actuation chamber (194) with a second primary pressure actuation surface area $SSA_B$ of said control valve (178),
        said second secondary pressure port (192) configured to directly port said damper fluid (32) from said second variable volume working chamber (44) to a second secondary pressure valve actuation chamber (196) with a second secondary pressure actuation surface area $SSA_S$ of said control valve (178).

2. The control valve assembly (176) in claim 1 wherein $FSA_B > FSA_S$ and $SSA_B > SSA_S$.

3. The control valve assembly (176) in claim 1 further comprising a first spring (200) and a second spring (200'), said first spring (200) and said second spring (200') capable of resisting an actuation of said control valve (178) from a centered position centered about said fluid damping controlled conduit (76").

4. The control valve assembly (176) in claim 1 wherein said fluid damping controlled conduit (76") is fluidly isolated from said damper fluid (32) in said first primary pressure valve actuation chamber (184), said first secondary pressure valve actuation chamber (186), said second primary pressure valve actuation chamber (194), said second secondary pressure valve actuation chamber (196) with said damper fluid (32) flowing through said fluid damping controlled conduit (76") is configured to not interact with said damper fluid (32) in said first primary pressure valve actuation chamber (184), said first secondary pressure valve actuation chamber (186), said second primary pressure valve actuation chamber (194), and said second secondary pressure valve actuation chamber (196).

5. The control valve assembly (176) in claim 1 wherein said control valve (178) has a centered obstructing position centered about said fluid damping controlled conduit (76").

6. The control valve assembly (176) in claim 1 wherein said control valve (178) has a centered position about said fluid damping controlled conduit (76") and has a first valve controlled conduit side (300) and a second center valve controlled conduit side (300') with said first primary pressure valve actuation chamber (184) and said second secondary pressure valve actuation chamber (196) oriented on said first valve controlled conduit side (300) and said first secondary pressure valve actuation chamber (186) and said second primary pressure valve actuation chamber (194) opposingly oriented on said second center valve controlled conduit side (300') with a first spring (200) on said first valve controlled conduit side (300) and a second spring (200') on said second center valve controlled conduit side (300').

7. The control valve assembly (176) in claim 6 wherein said first spring (200) is disposed in said first primary pressure valve actuation chamber (184) and said second spring (200') is disposed in said second primary pressure valve actuation chamber (194).

8. The control valve assembly (176) in claim 1 wherein said control valve (178) has a spring preloaded home position centered about said fluid damping-controlled conduit (76") and has a first valve controlled conduit side (300) and a second center valve controlled conduit side (300') with said first primary pressure valve actuation chamber (184) and said second secondary pressure valve actuation chamber (196) oriented on said first valve controlled conduit side (300) and said first secondary pressure valve actuation chamber (186) and said second primary pressure valve actuation chamber (194) opposing oriented on said second center valve controlled conduit side (300') with said first primary pressure valve actuation chamber (184) proximate said second secondary pressure valve actuation chamber (196) and said first secondary pressure valve actuation chamber (186) proximate said second primary pressure valve actuation chamber (194).

9. The control valve assembly (176) in claim 8 wherein said first primary pressure valve actuation chamber (184) is fluidly isolated from said second secondary pressure valve actuation chamber (196) and said first secondary pressure valve actuation chamber (186) is fluidly isolated from said second primary pressure valve actuation chamber (194).

10. The control valve assembly (176) in claim 9 wherein said second primary pressure valve actuation chamber (194) is fluidly isolated from first secondary pressure valve actuation chamber (186) with said second primary pressure valve actuation chamber (194) fluidly concentrically oriented with said first secondary pressure valve actuation chamber (186).

11. The control valve assembly (176) in claim 8 with said first primary pressure valve actuation chamber (184) being fluidly isolated from said second secondary pressure valve actuation chamber (196) with said first primary pressure valve actuation chamber (184) and said second secondary pressure valve actuation chamber (196) concentrically oriented.

12. The control valve assembly (176) in claim 8 with said second primary pressure valve actuation chamber (194) fluidly isolated from first secondary pressure valve actuation chamber (186) with said second primary pressure valve actuation chamber (194) fluidly concentrically oriented with said first secondary pressure valve actuation chamber (186).

13. The control valve assembly (176) in claim 1 wherein said control valve (178) is longitudinally extending along a longitudinal valve center axis (500) and said fluid damping controlled conduit (76") is longitudinally extending along a longitudinal conduit center axis (502) with said longitudinal valve center axis (500) off set to a side of said longitudinal conduit center axis (502).

14. The control valve assembly (176) in claim 1 wherein said control valve (178) is longitudinally extending along a longitudinal valve center axis (500) and said fluid damping controlled conduit (76") is longitudinally extending along a longitudinal conduit center axis (502) with said longitudinal valve center axis (500) oriented substantially normal to said longitudinal conduit center axis (502).

15. The control valve assembly (176) in claim 1 including a piston (78) separating said first variable volume working chamber (42) and said second variable volume working chamber (44).

16. The control valve assembly (176) in claim 15 with said piston (78) having a piston working longitudinal axis (504) with said control valve (178) longitudinally extending along a longitudinal valve center axis (500) with said longitudinal valve center axis (500) substantially normal to said piston working longitudinal axis (504).

17. The control valve assembly (176) in claim 15 with said piston (78) having a piston working longitudinal axis (504) with said fluid damping controlled conduit (76") longitudinally extending along a longitudinal conduit axis with said longitudinal valve center axis (500) oriented relative to said piston working longitudinal axis (504).

18. The control valve assembly (176) in claim 1 wherein $FSA_B$ is substantially equal to $SSA_B$ and $FSA_B$ is substantially equal to $SSA_S$.

19. The control valve assembly (176) in claim 1 wherein said control valve assembly (106) is incorporated into a rotary wing system (20) with at least one rotating blade (22) rotating about a rotation axis (28), said rotary wing system (20) having a rotor blade natural frequency and a rotor wing system operating frequency when rotating about said rotation axis (28), said rotary wing system (20) including a fluid damper (30).

20. The control valve assembly (176) in claim 19 wherein a working of said first variable volume working chamber (42) and said second variable volume working chamber (44) by said rotor wing system operating frequency fluidly actuates the opening of said control valve (178) obstructing said damper fluid (32) flow through said fluid damping controlled conduit (76"), and a working of said first variable volume working chamber (42) and said second variable volume working chamber (44) by said rotary wing system rotor blade natural frequency maintains said control valve (178) obstructing said damper fluid (32) flow through said fluid damping controlled conduit (76").

21. The control valve assembly (176) in claim 20 said fluid damper (30) including a volume compensator channel (50) in fluid communication with said damper fluid (32), said volume compensator channel (50) including a centrifugal force mass member (52) movable along a volume compensating length of said volume compensating channel (50), wherein a rotation about said rotation axis (28) forces said centrifugal force mass member (52) towards an outboard end of said volume compensating channel (50) and pushes damper fluid (32) from said volume compensator channel (50) towards said first and second variable volume working chambers (42, 44), said centrifugal force mass member (52) configured to create a positive pressure and maintain a full volume in said pressure ports (180, 182, 190, 192) and in said first and second variable volume working chambers (42, 44).

\* \* \* \* \*